US010640611B2

(12) United States Patent
Göbelt et al.

(10) Patent No.: US 10,640,611 B2
(45) Date of Patent: May 5, 2020

(54) POLYAMINE ADDITION COMPOUNDS

(71) Applicant: BYK-Chemie GmbH, Wesel (DE)

(72) Inventors: Bernd Göbelt, Wesel (DE); Andreas Okkel, Wesel (DE); Jürgen Omeis, Dorsten-Lembeck (DE); Wolfgang Pritschins, Wesel (DE); Jörg Bömer, Wesel (DE); Sabine Stelz, Oberhausen (DE); Andrea Eßer, Wesel (DE)

(73) Assignee: BYK-Chemie, GmbH, Wesel (DE)

( * ) Notice: Subject to any disclaimer, the term of this patent is extended or adjusted under 35 U.S.C. 154(b) by 145 days.

(21) Appl. No.: 15/038,379

(22) PCT Filed: Nov. 28, 2014

(86) PCT No.: PCT/EP2014/075988
§ 371 (c)(1),
(2) Date: Jul. 6, 2016

(87) PCT Pub. No.: WO2015/079033
PCT Pub. Date: Jun. 4, 2015

(65) Prior Publication Data
US 2017/0190840 A1     Jul. 6, 2017

(30) Foreign Application Priority Data

Nov. 29, 2013   (EP) .................................... 13195200

(51) Int. Cl.
*C08G 73/02* (2006.01)
*C08G 63/685* (2006.01)
*C08G 63/91* (2006.01)

(52) U.S. Cl.
CPC ..... *C08G 73/0206* (2013.01); *C08G 63/6852* (2013.01); *C08G 63/912* (2013.01)

(58) Field of Classification Search
CPC ............ C08G 73/0206; C08G 63/6852; C08G 63/912
See application file for complete search history.

(56) References Cited

U.S. PATENT DOCUMENTS

| 4,032,698 A | 6/1977 | Ashe |
| 4,101,529 A | 7/1978 | Ammons |
| 4,476,054 A | 10/1984 | Disteldorf et al. |
| 4,668,780 A | 5/1987 | Disteldorf et al. |
| 4,795,796 A | 1/1989 | Haubennestel et al. |
| 4,942,213 A | 7/1990 | Haubennestel et al. |
| 5,912,314 A | 6/1999 | Wolf |
| 6,111,054 A | 8/2000 | Haubennestel et al. |
| 6,420,466 B1 | 7/2002 | Haubennestel et al. |
| 6,444,778 B1 | 9/2002 | Laas et al. |
| 8,268,957 B2 | 9/2012 | Liu et al. |
| 9,296,860 B2 | 3/2016 | Friederichs et al. |
| 2005/0250927 A1 | 11/2005 | Pritschins et al. |
| 2013/0312636 A1 | 11/2013 | Fornara et al. |
| 2014/0194537 A1 | 7/2014 | Göbelt et al. |

FOREIGN PATENT DOCUMENTS

| CN | 101357992 A | 2/2009 | |
| CN | 103242517 A | 8/2013 | |
| DE | 1 670 720 | 1/1971 | |
| EP | 0 045 995 A1 | 2/1982 | |
| EP | 0 099 976 A1 | 2/1984 | |
| EP | 0 270 126 A2 | 6/1988 | |
| EP | 0 318 999 A2 | 6/1989 | |
| EP | 0 795 569 A1 | 9/1997 | |
| EP | 0 893 155 A2 | 1/1999 | |
| EP | 1 048 681 A2 | 11/2000 | |
| EP | 1 174 428 A2 | 1/2002 | |
| EP | 1 593 700 A1 | 11/2005 | |
| GB | 1153815 | 5/1969 | |
| JP | H05222258 A | 8/1993 | |
| JP | H08-269196 A | * 10/1996 | ............ C08G 73/02 |
| JP | 2000063513 A | 2/2000 | |
| JP | 2000073055 A | 3/2000 | |
| JP | 2003155321 A | 5/2003 | |
| WO | WO 84/02705 A1 | 7/1984 | |
| WO | WO 01/53376 A1 | 7/2001 | |
| WO | WO 2011/076785 A1 | 6/2011 | |
| WO | WO 2012/107379 A1 | 8/2012 | |
| WO | WO 2012/175159 A1 | 12/2012 | |
| WO | WO 2012/175622 A1 | 12/2012 | |

OTHER PUBLICATIONS

Office Action issued in co-pending Chinese Application CN 201480064971, received Feb. 1, 2017.
PCT/EP2014/075988—International Search Report, dated Jun. 29, 2015.
PCT/EP2014/075988—International Written Opinion, dated Jun. 29, 2015.
PCT/EP2014/075988—International Preliminary Report on Patentability, dated May 31, 2016.
Office Action issued in co-pending Japanese Application No. 2016-534999 A, dated Sep. 26, 2017.
Office Action issued in co-pending Japanese Application No. 2016-534999 A, dated Jan. 9, 2018.

* cited by examiner

*Primary Examiner* — John E Uselding
(74) *Attorney, Agent, or Firm* — Curatolo Sidoti Co., LPA; Joseph G. Curatolo; Salvatore A. Sidoti

(57) ABSTRACT

The invention relates to polyamine addition compounds, methods for the production thereof, the use thereof as crosslinking agents and dispersing agents, and paints and plastic materials containing the addition compounds.

17 Claims, No Drawings

POLYAMINE ADDITION COMPOUNDS

Amino group-comprising polymer, process for its preparation, its use, and coating materials and plastics comprising the polymer.

The present invention relates to addition compounds and salts thereof that are suitable as dispersants and dispersion stabilizers. The invention further relates to processes for preparing these addition compounds, to their use as dispersants and dispersion stabilizers for organic and inorganic pigments and also fillers in organic and aqueous systems, and to solids in powder or fiber form, for incorporation into liquid systems, the solids being coated with such dispersants. The subject matter of the present invention is apparent from the independent claims. The dependent claims relate to advantageous embodiments of the invention.

Wetting agents, present in solution or dispersion in a liquid, lower the surface tension or interfacial tension and so increase the wetting capacity of the liquid. In many cases it is only in this way, through wetting agents, that surface wetting is made possible at all.

Dispersants are suitable in general for stabilizing particulate solids in binders, paints, pigment pastes, plastics and plastics blends, adhesives, and sealants, for reducing the viscosity of such systems and also for improving the flow properties. Dispersion stabilizers are used in order to stabilize dispersions that have already been produced.

In order to be able to introduce solids into liquid media, high mechanical forces are required. It is customary to use dispersants in order to lower the dispersing forces and in order to minimize the overall input of energy into the system that is needed in order to deflocculate the particulate solids, and hence also to minimize the dispersing time. Such dispersants are surface-active substances of anionic, cationic and/or neutral structure. These substances are either, in small amounts, applied directly to the solid or added to the dispersing medium. It should be borne in mind that even after full deflocculation of the agglomerated solids into primary particles (after the dispersing operation), there may be instances of reagglomeration, thereby wholly or partly bringing the dispersing effort to naught. Typical consequences of inadequate dispersing and/or of reagglomeration are unwanted effects, such as viscosity increase in liquid systems, shade drift and loss of gloss in paints and in coatings, and reduction in mechanical strength and in the homogeneity of the material in plastics.

A variety of types of compounds are suitable in practice as wetting agents and dispersants. The reason for this in particular is that there is a large number of different systems based, in particular, on different kinds of binders in combination with different particles to be dispersed, such as pigments, fillers, and also fibers. One class of substance which finds broad application as wetting agents and dispersants is that of sidechain-containing polymers which include a core consisting of polyethylenimines.

The sidechain here may be connected to the polyethylenimine core via a chemical bond, as described for example in EP 1 593 700 and in U.S. Pat. No. 8,268,957; an alternative possibility is a salt formation of the polyethylenimine core, with the side chain carrying acidic groups. These compounds are described in EP 0 893 155, for example.

The polyamines described in the abovementioned patent applications, and described for the preparation of the dispersants, are linear or branched polyamines having short alkylene bridges from $C_2$ to $C_4$, such as polyethylenimines. The wetting agents and dispersants produced using these polyamines have a high density of amine anchoring groups in the core. These groups, particularly when unsalified, are able to neutralize the acid catalyst in the case of acid-catalyzed paint formulations, and so to adversely affect the curing reaction. Moreover, there are only a small number of aliphatic branched polyamines available technically, and hence only a small possibility for achieving structural variation in the architecture, the polarity, and the amine density of the polyamine.

The problem addressed by the present invention relative to the prior art stated above was therefore that of providing improved wetting agents and dispersants which have a small influence on coating materials which cure by acid catalysis. A further intention was to find an alternative for polyethylenimines as a polyamine component of wetting agents and dispersants, such an alternative allowing the realization of a greater structural diversity in the polyamine, in order thereby to set properties such as the compatibility with different binders.

The solution to this problem is an amino group-comprising polymer PAS or salt thereof obtainable by reaction with an acid, the polymer being obtainable by a multistage synthesis wherein an intermediate PA is prepared by reaction of at least one compound P with at least an amine A, the compound P comprising
  2 to 6 groups that are reactive toward hydroxyl groups and/or amino groups, and
the amine A comprising
  (i) m=1 to 8 primary and/or secondary amino groups,
  (ii) n=0 to 5 hydroxyl groups and
  (iii) l=0 to 5 tertiary amino groups, where
  (iv) m+n≥2 and
  (v) the compound A besides nitrogen atoms, oxygen atoms, and hydroxyl groups contains only hydrocarbon groups, and
the intermediate PA has structural units of the general formula (I)

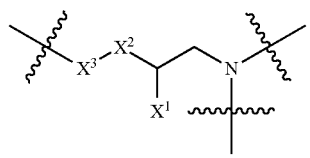

in which
$X^1$=H or OH,
$X^2$=$CH_2$ or C=O, and
$X^3$=O or NH,
and where
the intermediate PA
(a) is reacted with one or more components S that are reactive toward hydroxyl groups and/or amino groups, to give an amino group-comprising polymer, and/or
(b) is reacted in a ring-opening polymerization with at least one lactone or with a mixture of lactones, to give an amino group-comprising polymer,
(c) and 0-80% of the primary and secondary amino groups present originally in the intermediate PA are reacted with one or more species of a component U, selected from the group of the hydroxyl-functional acrylates and/or a cyclic compound selected from the group of the oxiranes and oxetanes, the lactones, and cyclic carbonates, the reaction taking place with introduction of hydroxyl groups, whereby the reactions under (a), (b), and (c) may take place in any desired combination and temporal sequence relative to one another.

The symbol

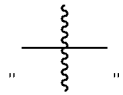

means that the structure shown is linked to a higher-order general structure.

The compound P comprises usefully 2 to 6, preferably 2 to 3, and more preferably 2 groups that are reactive toward hydroxyl groups and/or amino groups, these groups being usefully selected from the group of the acrylates, epoxides, carboxylic acids, and carboxylic acid derivatives, such as carboxylic esters, carboxylic chlorides and carboxylic anhydrides, with the carboxylic esters being particularly preferred from the group of the carboxylic acid derivatives. The upper limit on the number-average molecular weight ($M_n$) of P is usefully 1000, preferably 600, more preferably 300, and very preferably 250.

Preferred compounds A comprise primarily methylene groups —(CH2)n-, where n is usefully 1-6, preferably 2-3, and more preferably 2. A comprises at least 1, preferably 2, and more preferably 3-5 amino groups. The maximum number of amino groups is 8, preferably 6, more preferably 5. The upper limit on the number-average molecular weight ($M_n$) of A is usefully 2000, preferably 1000, more preferably 600, very preferably 300, and especially preferably 250.

Examples of suitable amine-containing compounds A are, in particular, aliphatic, cycloaliphatic, mixed aliphatic-cycloaliphatic, aromatic and/or araliphatic diamines and/or polyamines, or mixtures which comprise two or more of these amines. Examples thereof are ethylenediamine, 1,2- and 1,3-diaminopropane, 1,4-diaminobutane, hexamethylenediamine, diethylenetriamine (DETA), triethylenetetramine (TETA), tetraethylene-pentamine (TEPA), pentaethylenehexamine, hexaethyleneheptamine, and higher homologs, higher linear condensates of the general formula $NH_2$—$(C_2H_4NH)_n$—$C_2H_4$—$NH_2$ with n<7, dipropylenetriamine, bis(hexamethylene)-triamine, 3-(2-aminoethyl) aminopropylamine, N,N-bis(3-aminopropyl)-methylamine, tetramethyliminobispropylamine, N,N-dimethyldipropylene-triamine, bis(3-dimethylaminopropyl)amine, and N,N'-bis(3-aminopropyl)-ethylenediamine, tris(3-aminopropyl) amine, tris(2-aminoethyl)amine; further examples are isophoronediamine, Priamin 1074 from Croda, 4,4'-diamino-diphenylmethane, 1,3- and 1,4-xylylenediamine, 4,4'-diaminodicyclohexyl-methane, 1,4-bis(aminomethyl) cyclohexane, diamines and/or polyamines based on polyalkylene oxides, such as low molecular weight polyethers with amino groups, such as, for example, the following variants sold by Huntsman under the trade name of Jeffamine® polyoxyalkylenamines: D-230, D-400, D-2000, XTJ-510, XTJ-500, XTJ-501, XTJ-502, XTJ-504 (Jeffamin EDR 148), HK-511, T-403, XTJ-509, and T-5000.

Examples of amine-containing compounds A which in addition to a primary or secondary amine comprise further groups that are reactive toward the ester, such as primary or secondary amines and/or alcohols, are compounds which carry three primary or secondary amino groups, such as diethylenetriamine, and amines which as well as a primary amino group comprise at least one further group that is reactive toward the ester, or which as well as a secondary amino group comprise at least two further groups that are reactive toward the ester, such as monoethanolamine, 2-amino-2-(hydroxymethyl)-1,3-propanediol, 2-(2-aminoethoxy)ethanol, aminoethylethanolamines, 2-amino-2-desoxy-D-glucose chitosamine, and diethanolamine.

As component A it is likewise possible to use mixtures of these compounds.

The polyamines PA can be prepared by a variety of synthesis pathways.

Option 1:

According to this synthesis pathway, the polyamine PA is constructed by the reaction of a component P with a component A. The polyamine PA is constructed by a reaction in which building blocks $CG_h$ where (h=2-8) are used or are formed during the reaction from an amine A and a component P. The building block $CG_h$ possesses at least one carboxylic ester group C' and at least two groups G' that are reactive toward the carboxylic ester group C'; if one of these reactive groups G' is not an amine, the building block $CG_h$ also comprises at least a tertiary amine in the structure.

The theory of the construction of branched polyamines as set out under option 1 is described by, for example, Gao and Yan in Prog. Polym. Sci. 29 (2004) 183-275 in section 3.4, pp. 208-212.

The molecule $CG_h$ can be constructed by reaction of a component P—for option 1, selected from the group of ethylenically unsaturated ester compounds in which the C=C double bond and the carbonyl double bond of the ester are conjugated—with an amine A selected from the group of diamines or amines which as well as a primary or secondary amine comprise 2-7 further groups that are reactive toward the ester, such as primary or secondary amines and/or alcohols. An access route to branched polyamines is described for example in CN02111578.8, WO2011/076785, and WO2012/175622; in WO2011/076785 and WO2012/175622, only the use of α,β-unsaturated esters having a plurality of ester groups is described for component P.

Examples of component P according to option 1, selected from the group of ethylenically unsaturated ester compounds wherein the C=C double bond and the carbonyl double bond of the ester are conjugated, are alkyl acrylates, such as, for example, methyl acrylate, ethyl acrylate, n-propyl acrylate, i-propyl acrylate, n-butyl acrylate, i-butyl acrylate, t-butyl acrylate, 2-ethylhexyl acrylate, cyclohexyl acrylate, and lauryl acrylate;

monoacrylates of short-chain ethers, such as tetrahydrofurfuryl acrylate, methoxyethoxyethyl acrylate, 1-butoxypropyl acrylate, cyclohexyloxymethyl acrylate, methoxymethoxyethyl acrylate, benzyloxymethyl acrylate, furfuryl acrylate, 2-butoxyethyl acrylate, 2-ethoxyethyl acrylate, allyloxymethyl acrylate, 1-ethoxybutyl acrylate, 1-ethoxyethyl acrylate, ethoxymethyl acrylate;

maleic diesters, such as dimethyl maleate, diethyl maleate, and dibutyl maleate;

fumaric diesters, such as dimethyl fumarate, diethyl fumarate, and dibutyl fumarate;

itaconic esters, such as dimethyl itaconate and diethyl itaconate.

As component P under option 1 it is likewise possible to use mixtures of these compounds.

Preferred components P under option 1 are compounds selected from the group of the acrylic esters; more preferred are short-chain alkyl acrylates, and particularly preferred are methyl acrylate and ethyl acrylate.

The component P and the amine A are usefully used in a molar ratio of 1 to 0.5 to 1 to 3, preferably 1 to 0.8 to 1 to 2, more preferably 1 to 1 to 1 to 1.7, and very preferably 1 to 1.01 to 1 to 1.5.

The Size of the Polyamine PA Under Option 1 Can be Controlled by:
1) variation of the reaction conditions, such as the choice of the solvent, for example
2) the molar ratio of amine A to component P The construction of the polyamines PA under option 1 takes place, for example, in two steps. In the first step, the $CG_h$ building block is prepared. The $CG_h$ building blocks are constructed via the Michael addition of a primary or secondary amino group to the C=C double bond that is conjugated to the carbonyl double bond of the ester. These reactions take place usefully in a temperature range from 0 to 100° C., preferably from 10 to 80° C., and more preferably from 15 to 50° C. The Michael addition may be carried out either without solvent or else in suitable polar and nonpolar solvents. Suitable solvents are solvents in which the reactants and the reaction products are at least partly soluble. The solvents may be left in the product or removed. In cases where the solvents are to be removed, it is useful to use volatile solvents. Water and low molecular mass alcohols such as, for example, methanol, ethanol, propanol, isopropanol, and butanol can be readily removed, for example, in the subsequent course of the synthesis or the application, by means of distillation.

Monitoring the Michael addition reaction can be done via NMR measurements, involving monitoring the conversion of the C=C double bond that is conjugated to the carbonyl double bond of the ester.

The product of the Michael addition is subsequently subjected to polycondensation to form the polyamine PA. These reactions take place usefully in a temperature range from 50 to 180° C., preferably 70 to 160° C., and more preferably 80 to 150° C. The alcohol that is formed on cleavage of the carboxylic ester, and optionally the solvent used, are removed from the reaction mixture. Where water is selected as solvent, the size of the resulting polyamines will be lower than in, for example, alcohol solvents or in the absence of solvents, since partially there is conversion of the esters to carboxylic acids and the carboxylic acids form salts with the amino groups.

Where the $CG_h$ building block used in the polycondensation comprises a compound which possesses no aminic groups reactive toward the ester, the polycondensation is carried out using catalysts such as tetrabutyl titanate, zirconium butoxide, zirconium propoxide, or zirconium acetylacetonate, for example. Described in the literature is the construction of such structures using various catalysts such as, for example, para-toluenesulfonic acid (X. Wang, X. Yuan, T. Qiang, X. Chen, *e-Polymers* 2009, 115, 1-15) or zinc acetate and also tetrabutyl titanate (C. Gao et al., *Biomacromolecules* 2003, 4, 704-712).

The polycondensation may take place either without or with addition of core molecules. Examples of core molecules are ammonia or amines that are suitable as amine A. Preferred amines are compounds comprising 2 to 3 primary amino groups, such as tris(2-aminoethyl)amine and tris(3-amino-propyl)amine, for example. Where the polycondensation takes place using a catalyst, hydroxyl group-comprising compounds are also suitable as core molecules. These compounds usefully comprise 1 to 6 hydroxyl groups. Examples of hydroxyl group-comprising core molecules are 1,1,1-trimethylolpropane, triethanolamine, glycerol, diglycerol, triglycerol, 1,3,5-tris-(2-hydroxyethyl)cyanuric acid, and sorbitol.

The size of the polyamine PA here can be controlled through the molar ratio of the core molecule and the $CG_h$ building block.

Option 2:

In addition to the polyamines PA prepared via a one-stage polycondensation under option 1, the polyamine PA may likewise be constructed, starting from the same components A and P, in shell fashion, via a stepwise synthesis. For this purpose, in contrast to option 1, the components A and P are used alternately in excess in a synthesis sequence of two alternating stages, and the excess after each stage is removed by distillation. The stepwise construction of dendritic polyamidoamines has been described by, for example, D. A. Tomalia et al. in Polymer Journal 1985, 17, 117-132 and also in U.S. Pat. No. 4,568,737.

In this case, the dendritic polyamine PA is prepared starting from ammonia or from an amine A such as ethylenediamine, for example, via a two-stage synthesis sequence. The first stage of the synthesis comprises the complete reaction of the amine core with an excess of alkyl acrylate as component P, such as methyl acrylate, for example, by means of a Michael addition, and removal of the unreacted alkyl acrylate. The second stage comprises the complete reaction of the resulting esters with an excess of diamine as component A, such as ethylenediamine, for example, and removal of the excess of diamine used. The repeated sequence of these two stages constructs, in steps, a polyamine PA.

Examples of suitable amine-containing compounds A under option 2 are, in particular, aliphatic, cycloaliphatic, mixed aliphatic-cycloaliphatic, aromatic and/or araliphatic diamines, or mixtures comprising two or more of these amines. Examples thereof are ethylenediamine, 1,2- and 1,3-diaminopropane, 1,4-diaminobutane, and 1,6-hexamethylenediamine.

Preferred components A under option 2 are relatively volatile diamines, since they are easier to remove. Particularly preferred are ethylenediamine and 1,2- and 1,3-diaminopropane.

Examples of component P under option 2, selected from the group of ethylenically unsaturated ester compounds wherein the C=C double bond and the carbonyl double bond of the ester are conjugated, are alkyl acrylates, such as, for example, methyl acrylate, ethyl acrylate, n-propyl acrylate, i-propyl acrylate, n-butyl acrylate, i-butyl acrylate, t-butyl acrylate, 2-ethylhexyl acrylate, and cyclohexyl acrylate. As component P under option 2 it is likewise possible to use mixtures of these compounds.

Preferred components P under option 2 are relatively volatile acrylates, since they are easier to remove. Particularly preferred are methyl acrylate and ethyl acrylate.

Option 3:

Preparation of polyamine PA by reaction of the amine-containing compounds A with compounds P, the compound P comprising 2 to 6 groups reactive toward amino groups and selected from the group of the acrylates and/or of the epoxides. It is also possible for compounds with epoxide groups and acrylic groups to be employed, such as glycidyl acrylate, for example. Some of the amino groups of A may also be reacted with monofunctional acrylates and/or epoxides. These monofunctional compounds typically comprise a total of 6 to 70 carbon atoms in each case.

A number of less than 6 carbon atoms frequently brings about an excessive polarity, while more than 70 carbon atoms are usually detrimental to the universal compatibility.

These reactions take place usefully in a temperature range from 20 to 140° C., preferably at not more than 120° C., and more preferably at not more than 100° C.

In the reaction with the epoxides, a secondary hydroxyl group is formed and, on the nitrogen atom involved in the reaction, a secondary or tertiary amino group.

Examples of Polyfunctional Acrylates are:
di-, tri-, tetra-functional polyester, polyether, polyether/ester, urethane, or epoxy acrylates, mono-, di-, tri- or polyalkylene glycol diacrylates such as, for example, mono-, di-, tri- or polyethylene glycol diacrylate, mono-, di-, tri- or polypropylene glycol diacrylate, butanediol diacrylate, 1,6-hexanediol diacrylate, trimethylolpropane triacrylate, neopentyl glycol propyleneoxy diacrylate, tricyclodecanediol diacrylate, glycerol diacrylate, glycerol triacrylate, trimethylolpropane triacrylate, di(trimethylolpropane) tetraacrylate, pentaerythritol triacrylate, dipentaerythritol pentaacrylate.

Examples of Polyfunctional Epoxides are:
mono-, di-, tri- or polyalkylene glycol glycol diglycidyl ethers such as, for example: mono-, di-, tri- or polyethylene glycol diglycidyl ether, propanediol diglycidyl ether, di-, tri- or polypropylene glycol diglycidyl ether, 1,4-butanediol diglycidyl ether, 1,6-hexanediol diglycidyl ether, cyclohexanedimethanol diglycidyl ether, neopentyl glycol diglycidyl ether, glycerol triglycidyl ether, di-, tri- or polyglycerol triglycidyl ethers, trimethylolpropane triglycidyl ether, pentaerythritol tetraglycidyl ether, dipentaerythritol pentaglycidyl ether.

Examples of monofunctional acrylates are alkyl acrylates, such as, for example, methyl acrylate, ethyl acrylate, n-propyl acrylate, i-propyl acrylate, n-butyl acrylate, i-butyl acrylate, tert-butyl acrylate, 2-ethylhexyl acrylate, cyclohexyl acrylate, and lauryl acrylate;
monoacrylates of short-chain ethers, such as tetrahydrofurfuryl acrylate, methoxyethoxyethyl acrylate, 1-butoxypropyl acrylate, cyclohexyloxymethyl acrylate, methoxymethoxyethyl acrylate, benzyloxymethyl acrylate, furfuryl acrylate, 2-butoxyethyl acrylate, 2-ethoxyethyl acrylate, allyloxymethyl acrylate, 1-ethoxybutyl acrylate, 1-ethoxyethyl acrylate, ethoxymethyl acrylate.

Suitable monofunctional epoxides are, for example, aliphatic, cycloaliphatic and/or aromatic glycidyl ethers such as, for example, $C_1$-$C_{20}$ alkyl glycidyl ethers, phenyl glycid ethers, cresyl glycidyl ether, naphthyl glycidyl ether, butyl glycid ether, p-tert-butylphenyl glycid ether, 2-ethylhexyl glycid ether, $C_{12}$-$C_{14}$ glycid ethers, allyl glycidyl ether, 2,3-epoxypropyl neodecanoate (Cardura® E10, Resolution Performance Products).

The polymers PAS of the invention are prepared by a procedure in which the polyamine PA
(a) is reacted with one or more components S that are reactive toward hydroxyl groups and/or amino groups, to give an amino group-comprising polymer, and/or
(b) is reacted in a ring-opening polymerization with at least one lactone or with a mixture of lactones, to give an amino group-comprising polymer,
(c) and 0-80% of the primary and secondary amino groups present originally in the intermediate PA are reacted with one or more species of a component U, selected from the group of the hydroxyl-functional acrylates and/or a cyclic compound selected from the group of the oxiranes and oxetanes, the lactones, and cyclic carbonates, the reaction taking place with introduction of hydroxyl groups, whereby the reactions under (a), (b), and (c) may take place in any desired combination and temporal sequence relative to one another.

The polyamine PA here can be reacted with one or more of the reactive components S identified below. The polyamine PA may also be reacted with one or more of the components U identified below.

The components S and optionally U are used in amounts such that at least 10%, usefully at least 25%, preferably at least 50%, more preferably at least 75%, and very preferably all of the reactive groups originally present in the intermediate PA can be reacted.

Component U comprises
a) Hydroxyl-functional acrylates
Suitable hydroxyl-functional acrylates are, for example, 2-hydroxyethyl acrylate, 2-hydroxypropyl acrylate, 2-hydroxybutyl acrylate, 2-(2-hydroxy-ethoxy)ethyl acrylate, 2-hydroxy-3-[3-(trimethoxysilyl)propoxy]propyl acrylate, 2-hydroxy-3-phenoxypropyl acrylate, polyethylene glycol acrylates such as, for example, the variants AE-90, AE-200 and AE-400, sold by NOF under the trade name BLEMMER®, polypropylene glycol acrylates such as, for example, the variants AP-150, AP-400, and AP-550, sold by NOF under the trade name BLEMMER®, and lactone-modified hydroxyethyl acrylates such as, for example, the FA variants sold by DAICEL Corporation under the trade name Placcel.

b) Oxiranes and/or oxetanes
Suitable oxiranes are, for example, aliphatic, cycloaliphatic and/or aromatic glycidyl ethers such as, for example, C1-20 alkyl glycidyl ethers, phenyl glycid ether, cresyl glycidyl ether, naphthyl glycidyl ether, butyl glycid ether, p-tert-butylphenyl glycid ether, 2-ethylhexyl glycid ether, C12-C14 glycid ethers, allyl glycidyl ether, or 2,3-epoxypropyl neodecanoate (Cardura E10, Resolution Performance Products). Monofunctional epoxides are preferred. The reaction with the epoxides produces a secondary hydroxyl group and, on the nitrogen atom involved in the reaction, a secondary or tertiary amino group.

Suitable oxetanes are, for example, 3-ethyl-3-(phenoxymethyl)oxetane and 3-ethyl-3-(hydroxymethyl)oxetane.

c) Lactones
Suitable lactones are, for example, propiolactone, valerolactone, butyrolactone, caprolactone and/or substituted lactones. Preferred lactones are ε-caprolactone and δ-valerolactone.

d) Cyclic carbonates
Suitable cyclic alkene carbonates are those having 5- or 6-membered rings, which may optionally be substituted. Suitable substituents are aliphatic, cycloaliphatic and/or aromatic groups having up to 30 carbon atoms. Suitable cyclic carbonates are, for example, ethylene carbonate, propylene carbonate, glycerol carbonate, 5-methyl-5-propyltrimethylene carbonate, trimethylene carbonate, 4-methyltrimethylene carbonate, 5-methyltrimethylene carbonate, 5,5-dimethyltrimethylene carbonate, or 5,5-diethyltrimethylene carbonate.

As component U it is likewise possible to use mixtures of these compounds.

Component S comprises
a) isocyanate adducts of the general formula (II)

$$Y-O-CO-NH-R^1-NCO \qquad (II)$$

where $R^1$ is alike or different and is represented by a saturated or unsaturated, branched or unbranched organic radical comprising 6 to 20 carbon atoms.

The reaction of component S of the general formula (II) requires the presence of primary and/or secondary amino groups and/or alcohol groups.

b) Uretdione compounds of the general formula (III)

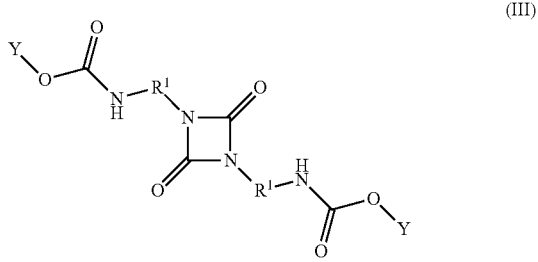

where $R^1$ is alike or different and is represented by a saturated or unsaturated, branched or unbranched organic radical comprising 6 to 20 carbon atoms.

The reaction of component S of the general formula (III) requires the presence of primary and/or secondary amino groups.

c) Acrylates of the general formula (IV)

$$H_2C=CH-COO-Y \qquad (IV)$$

The reaction of component S of the general formula (IV) requires the presence of primary and/or secondary amino groups.

d) Acids selected from the group of the sulfonic acids of the general formula (VII), carboxylic acids, and phosphoric esters.

Preferred are carboxylic acids of the general formula (V) and phosphoric esters of the general formula (VI)

$$(HOOC)_p-Y(X^1)_r \qquad (V)$$

$$(OH)_{3-v}PO(O-Y(X^1)_r)_v \qquad (VI)$$

$$Y-SO_2-OH \qquad (VII)$$

where p=1-3, r=1-5, $X^1$=H or OH, and v=1 or 2.

The reaction of component S of the general formula (V) requires the presence of primary and/or secondary and/or tertiary amino groups and/or alcohol groups.

The reaction of component S of the general formula (VI) requires the presence of primary and/or secondary and/or tertiary amino groups.

The reaction of component S of the general formula (VII) requires the presence of primary and/or secondary amino groups.

A further option for the construction of the side chains is the reaction of the polyamine PA or of a modified polyamine PA with lactones such as propiolactone, valerolactone, butyrolactone, caprolactone and/or substituted lactones by ring-opening polymerization, as described for example, later on below in the text in relation to the synthesis of monofunctional polyesters. Likewise possible is the use of a mixture of different lactones.

A modified polyamine PA here and below refers to a polyamine which is obtainable from PA by one or more of the reactions (a), (b), and (c) and which still comprises reactive groups, such as primary and/or secondary amines and/or hydroxyl groups.

Customarily Y comprises at least one polyether radical, polyester radical, hydrocarbon radical and/or polysiloxane radical.

Frequently, Y comprises a total of 1 to 450 ether oxygen atoms, present preferably in groups containing ether oxygen atoms and deriving from polytetrahydrofuran, polyoxetanes and/or polyoxiranes.

Typically Y comprises a total of 3 to 400 ether oxygen atoms, with at least 50 and preferably at least 80 mol % of the ether oxygen atoms being present in ethylene oxide and/or propylene oxide structural units.

The alcohol Y—OH used in the process of the invention may have additional heteroatoms, such as O, S, Si and/or N, and/or may comprise ether, urethane, carbonate, amide, urea and/or ester groups. In the groups Y, hydrogen is optionally substituted by halogen (fluorine and/or chlorine, for example). The radical Y may carry further groups, such as C=C double bonds, which behave inertly in the formation of the addition product. The ester, ether, urethane, carbonate and/or siloxane groups that may be present may adopt a block structure (for example, poly(ethylene oxide-block-propylene oxide-block-ε-caprolactone), or may form a gradient, or else may be arranged randomly.

1) Regarding Ether Groups or Polyethers which May be Present in Y:

As Y—OH it is possible to use monohydroxy polyethers. These may be prepared, for example, by alkoxylation of compounds described as Y—OH above, such as alkanols, cycloalkanols, phenols with alkylene oxides such as ethylene oxide, propylene oxide, butylene oxide, styrene oxide, aliphatic or aromatic glycid ethers, such as isopropyl glycid ether, butyl glycid ether, allyl glycid ether, 2-ethylhexyl glycid ether, cresyl glycid ether, and phenyl glycidyl ether. Mixtures of these raw materials may also be used. In the case of mixed polyethers they may be arranged randomly, in gradient form, or in blocks. These polyethers frequently have a number-average molecular weight ($M_n$) in the range from about 100 to 25 000, particularly frequently from 150 to 15 000, and particularly typically from 200 to 10 000 g/mol. Preferred polyethers are those based on ethylene oxide, propylene oxide, and mixtures thereof.

Examples are hydroxyl-functional vinyl compounds, such as hydroxybutyl vinyl ether, monohydroxy-functional polyoxyalkylene monoalcohols, such as allyl polyethers (e.g., Polyglykol A 350, Polyglykol A 500, Polyglykol A 1100, Polyglykol A 11-4, Polyglykol A 20-10 or Polyglykol A 20-20 from Clariant AG or Pluriol® A 010 R, Pluriol® A 11 RE, Pluriol® A 13 R, Pluriol®A 22 R or Pluriol® A 23 R from BASF AG), vinyl polyethers (such as Polyglykol V 500, Polyglykol V 1100 or Polyglykol V 5500 from Clariant AG), methanol-initiated polyoxyethylene monoalcohols (such as Pluriol® A 350 E, Pluriol® A 500 E, Pluriol® A 750 E, Pluriol® A 1020 E, Pluriol® A 2000 E or Pluriol® A 5010 E from BASF AG), alcohol-initiated polyoxypropylene monoalcohols (such as, for example, Polyglykol B01/20, Polyglykol B01/40, Polyglykol B01/80, Polyglykol B01/120 or Polyglykol B01/240 from Clariant AG or Pluriol® A 1350 P or Pluriol® A 2000 P from BASF AG), and polyalkoxylates initiated with various fatty alcohols and having variable degrees of alkoxylation (known under the trade name Lutensol® A, Lutensol® AT, Lutensol® AO, Lutensol® TO, Lutensol® XP, Lutensol® XL, Lutensol® AP and Lutensol® ON from BASF AG). Preferred for use are polyoxyalkylene monoalcohols which comprise ethylene oxide and/or propylene oxide and/or butylene oxide groups and optionally have been modified with styrene oxide. Particularly preferred is the use of polyoxyalkylene monoalcohols (such as Polyglykol B 11/50, Polyglykol B 11/70, Polyglykol B 11/100, Polyglykol B 11/150, Polyglykol B 11/300 or Polyglykol B 11/700 from Clariant AG, Pluriol® A 1000

PE, Pluriol® A 1320 PE, or Pluriol® A 2000 PE from BASF SE, or Terralox WA 110 from DOW Chemicals), which are butanol-initiated polyoxyalkylenes composed of ethylene oxide and propylene oxide and having a terminal OH group.

2) Regarding Hydrocarbon Radicals which May be Present in Y:

The hydrocarbon radicals take the form preferably of aryl radical, of branched or unbranched alkylaryl radical, aralkyl radical and/or of acyclic, cyclic branched or unbranched alkyl radical. Also possible is the use of mixtures of such compounds, i.e., of at least two different compounds Y—(OH). The aliphatic or araliphatic compounds Y—(OH) may be straight-chain or branched, saturated or unsaturated. Saturated species are preferred.

Examples of Y—OH with hydrocarbon radicals are methanol, ethanol, propanol, isopropanol, butanol, ethylhexanol, decanol, isotridecyl alcohol, lauryl alcohol, stearyl alcohol, isobornyl alcohol, benzyl alcohol, propargyl alcohol, oleyl alcohol, linoleyl alcohol, oxo-process alcohols, neopentyl alcohol, cyclohexanol, fatty alcohols, alkylphenols, alkylnaphthols and phenylethanol.

In addition, Y—OH may be polyolefin monools, such as unhydrogenated, partly hydrogenated and/or fully hydrogenated polybutadienes, unhydrogenated, partly hydrogenated and/or fully hydrogenated polyisoprenes, polyisobutylenes, polypropylenes, or ethylene/butylene copolymers. These compounds are known. The access route to hydroxyl-functional polyisobutylenes, for example, is described in U.S. Pat. No. 6,875,897.

3) Regarding Ester Groups or Polyesters, which May be Present in Y:

As Y—OH it is also possible to use monohydroxy monoesters and monohydroxy polyesters.

Hydroxy-functional acrylates or methacrylates, such as hydroxyethyl acrylate, hydroxyethyl methacrylate, and hydroxybutyl (meth)acrylate, are examples of suitable monohydroxy monoesters.

Polyesters can be prepared, for example, by reaction of dicarboxylic acids and also their esterifiable derivatives, such as anhydrides, acyl chlorides, or dialkyl esters (such as dimethyl esters or diethyl esters) through reaction with diols and with mono-, di- or tri-functional initiating components. The formation of dihydroxy polyesters may be suppressed as and when desired, by using appropriately stoichiometric amounts of monohydroxy compounds. The esterification may be carried out in bulk or else by azeotropic esterification in the presence of an azeotrope former. Examples of dicarboxylic acids are succinic acid, maleic acid, fumaric acid, glutaric acid, adipic acid, sebacic acid, pimelic acid, phthalic acid, or dimerized fatty acids, and their isomers, and also hydrogenation products. Examples of corresponding diols are: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and polyglycols based on ethylene glycol and/or propylene glycol.

Preferred polyesters for use as Y—OH are those which are obtainable by polycondensation of one or more, optionally alkyl-substituted, hydroxycarboxylic acids and/or ring-opening polymerization of the corresponding lactones, such as propiolactone, valerolactone, butyrolactone, caprolactone and/or substituted lactones, by means of a monohydroxy initiating component (as described in U.S. Pat. No. 4,647,647). They preferably possess a number-average molecular weight ($M_n$) of 150 to 5000 g/mol. As an initiating component it is possible in principle to use all other compounds listed as Y—OH. It is also possible in each case to use mixtures of the aforementioned compounds. The lactone polymerization is carried out by known methods, initiated by, for example, titanates, p-toluenesulfonic acid, or dibutyltin dilaurate, at temperatures from about 70° C. to 180° C. Particularly preferred are polyesters based on ε-caprolactone, optionally in combination with δ-valerolactone.

4) Regarding Polycarbonates which May be Present in Y:

The radical Y may also comprise carbonate groups, as are obtained by known reactions with open-chain and/or cyclic carbonates. Suitable, for example, are carbonate-modified linear polyesters or polycarbonate diols as are used in polyurethane production. Examples are described in U.S. Pat. No. 4,101,529. Suitable carbonates are, for example, aliphatic, cycloaliphatic, araliphatic and/or aromatic carbonic esters, such as dialkyl carbonates, e.g., dimethyl carbonate, diethyl carbonate, or diphenyl carbonate, catechol carbonate, or cyclic alkylene carbonates. Particularly suitable are cyclic alkylene carbonates having 5- or 6-membered rings, which may optionally be substituted. Preferred substituents are aliphatic, cycloaliphatic and/or aromatic groups having up to 30 carbon atoms. Examples of suitable cyclic alkylene carbonates are ethylene carbonate, propylene carbonate, glycerol carbonate, trimethylene carbonate, 4-methyltrimethylene carbonate, 5-methyltrimethylene carbonate, 5,5-dimethyltrimethylene carbonate, 5,5-diethyltrimethylene carbonate, or 5-methyl-5-propyltrimethylene carbonate.

5) Regarding Polyoxazolines which May be Present in Y:

As Y—OH it is also possible for hydroxyl-functional poly-2-alkyl-2-oxazolines or poly-2-alkyl-2-oxazines to function. Preference is given to using monohydroxy-functional compounds. Poly-2-alkyl-2-oxazolines or poly-2-alkyl-2-oxazines are obtained by cationic, ring-opening polymerization of 2-alkyl-2-oxazolines or 2-alkyl-2-oxazines with initiators, such as para-toluenesulfonic acid, methyl tosylate, or methyl triflate. The oxazolinium or oxazinium end groups resulting from the living cationic polymerization mechanism may be converted by alkaline hydrolysis via amino ester end groups into the more stable hydroxyamides. An alternative route to the preparation of monohydroxy-functional poly-2-alkyl-2-oxazolines or poly-2-alkyl-2-oxazines is the polymerization with 2-(4-hydroxyphenyl)-N-methyl-2-oxazolinium trifluoromethanesulfonate as initiating species (A. Groβ. G. Maier, O. Nuyken, Macromol. Chem. Phys. 197, 2811-2826 (1996)). Through the choice of the alkyl substituent it is possible to control the compatibility—for example, poly-2-ethyl-2-oxazoline has a water-solubility which makes it suitable for highly polar systems, while poly-2-lauryl-2-oxazoline, for example is compatible in nonpolar systems. Where block copolymers of 2-ethyl-2-oxazoline and 2-lauryl-2-oxazoline are formed, the polymers are notable for a particularly broad compatibility. Such poly-2-alkyl-2-oxazolines or poly-2-alkyl-2-oxazines usually possess a number-average molecular weight ($M_n$) of 300 to 20 000 g/mol, preferably of 500 to 10 000 g/mol. It is possible among others to use different kinds of 2-oxazolines, which possibly may have additional functional groups. Examples of such species are corresponding fatty acid-based 2-oxazolines.

6) Regarding OH-Functional Polymers of Ethylenically Unsaturated Compounds which May be Present in Y:

As Y—OH it is also possible to use OH-functional polymers of ethylenically unsaturated monomers which carry no OH functions. The OH functions can be introduced in a known way via initiators or chain transfer agents. Compounds of this kind have already been used in this field of the art for the preparation of other dispersants, as described in U.S. Pat. No. 4,032,698 or in EP 318 999. These polyacrylates usually have a number-average molecular weight ($M_n$) of 300 to 20 000 g/mol, preferably usually of 500 to 10 000 g/mol. They may be arranged in block structure or else randomly or may form a gradient.

Examples of ethylenically unsaturated monomers are alkyl (meth)acrylates of straight-chain, branched, or cycloaliphatic alcohols having 1 to 22 C atoms, such as methyl (meth)acrylate, ethyl (meth)acrylate, n-butyl (meth)acrylate, i-butyl (meth)acrylate, t-butyl (meth)acrylate, lauryl (meth) acrylate, 2-ethylhexyl (meth)acrylate, stearyl (meth)acrylate, cyclohexyl (meth)acrylate, isobornyl (meth)acrylate, and t-butyl (meth)acrylate; aryl (meth)acrylates, such as benzyl methacrylate or phenyl acrylate (in which the aryl radicals may in each case be unsubstituted or substituted up to four times), such as 4-nitrophenyl methacrylate; mono (meth)acrylates of ethers, polyethylene glycols, polypropylene glycols, or mixed polyethylene/propylene glycols having 5 to 80 C atoms, such as tetrahydrofurfuryl methacrylate, methoxyethoxyethyl methacrylate, 1-butoxypropyl methacrylate, cyclohexyloxymethyl methacrylate, methoxymethoxyethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate, poly(propylene glycol) methyl ether (meth)acrylate; aminoalkyl (meth)acrylates, such as N,N-dimethylaminoethyl (meth)acrylate, 2-trimethylammonioethyl methacrylate chloride, and N,N-dimethylaminopropyl (meth)acrylate; (meth)acrylates of halogenated alcohols, such as perfluoroalkyl (meth)acrylates having 6 to 20 C atoms; styrene and substituted styrenes, such as 4-methylstyrene, methacrylonitrile, and acrylonitrile;

ethylenically unsaturated heterocycles, such as, for example, 4-vinyl-pyridine and 1-[2-(methacryloyloxy)ethyl]-2-imidazolidinone;

vinyl esters of carboxylic acids having 1 to 20 C atoms, such as vinyl acetate;

maleimide, N-phenylmaleimide, and N-substituted maleimides having straight-chain, branched, or cycloaliphatic alkyl groups having 1 to 22 C atoms, such as N-ethylmaleimide and N-octylmaleimide; (meth)acrylamide; N-alkyl- and N,N-dialkyl-substituted acrylamides having straight-chain, branched, or cycloaliphatic alkyl groups having 1 to 22 C atoms, such as N-(tert-butyl)acrylamide and N,N-dimethylacrylamide;

Preferred non-OH-functional monomers are alkyl (meth) acrylates, aryl (meth)acrylates, and styrene.

7) Regarding Polysiloxanes which May be Present in Y:

As Y—OH, it is also possible to use monohydroxy-functional polysiloxanes. The polysiloxanes can be described by the general formula below:

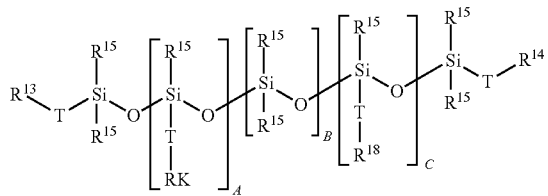

where

T=$C_1$-$C_{14}$ alkylene,

RK=unbranched polyether radical composed of alkylene oxide units with 1-6 carbon atoms, and/or aliphatic and/or cycloaliphatic and/or aromatic polyester radical having a number-average molecular weight ($M_n$) of between 130 and 2700 g/mol, $R^{13}$ and $R^{14}$ in each case independently represented by $C_1$-$C_{14}$ alkyl, aryl or aralkyl, —O($C_1$-$C_{14}$ alkyl, aryl or aralkyl), —OCO($C_1$-$C_{14}$ alkyl, aryl or aralkyl), —O—CO—O($C_1$-$C_{14}$ alkyl, aryl or aralkyl), —OSO$_2$ ($C_1$-$C_{14}$ alkyl, aryl, or aralkyl), —H, —Cl, —F, —OH, —R, —RK, $R^{15}$=$C_1$-$C_{14}$ alkyl, aryl, or aralkyl, $R^{16}$=polyhydroxy-functional branched polyglycidol polyether radical, consisting of or comprising a branched polyglycidol group, A=0-20, preferably 1-15, more preferably 1-8, B=2-300, preferably 10-200, more preferably 15-100, and C=0-20, preferably 1-15, more preferably 1-8, and if C=0 then $R^{14}$=$R^{16}$ and/or $R^{13}$=$R^{16}$. If the unit —[SiR$^{15}$(Z—R$^{16}$)]—O— is present, i.e. if C is at least 1, then it is possible for $R^{13}$ and $R^{14}$ to be different from $R^{16}$.

The stated polysiloxane radicals may also be present in the form of organomodified polysiloxane radicals.

The isocyanate adducts of the general formula (II) are synthesized by reaction of Y—OH with a diisocyanate $R^1$(NCO)$_2$ that contains NCO groups with different reactivities, the diisocyanate $R^1$(NCO)$_2$ being used at least in an equimolar ratio or in excess relative to the hydroxyl component Y—OH. If the diisocyanate $R^1$(NCO)$_2$ is used in excess, it must be removed after the reaction. Distillation, for example, is suitable for this purpose.

Using the diisocyanate $R^1$(NCO)$_2$ containing NCO groups having different reactivities in a molar excess results in a higher selectivity in the sense that preferably only exactly one NCO group of the diisocyanate is reacted with Y—OH. The greater the molar excess of diisocyanate, the higher, normally, is the selectivity with regard to the preparation of the isocyanate adduct (II). The unreacted diisocyanate obtained in excess as a result of its use is correspondingly removed at least partly (as far as possible completely) from the reaction mixture, since in the case of further reaction with the polyamine PA or with a modified polyamine PA, this diisocyanate leads to high molecular weight products with unwanted crosslinking. The synthesis of isocyanate adducts (II) of this kind is described in WO 2012/175159 or in EP 1 048 681, for example.

Depending on the reactivity of the individual reaction partners, the isocyanate addition may take place in the temperature range customary for this kind of reaction, from room temperature to about 150° C., preferably to 100° C., more preferably to 70° C. For the purpose of acceleration and reduction of secondary reactions, the known and customary catalysts can be used, such as tertiary amines, triethylamine, dimethylcyclohexylamine, N-methylmorpholine, N,N'-dimethylpiperazine, 2-(dimethylaminoethoxy) ethanol, diazabicyclo(2.2.2)octane, and the like, and also, in particular, organic metal compounds, such as titanic esters, iron compounds such as iron(III) acetylacetonate, tin compounds, examples being tin diacetate, tin dioctoate, tin dilaurate, or the dialkyl derivatives of tin dialkyl salts of aliphatic carboxylic acids such as dibutyltin diacetate, dibutyltin dilaurate, or the like. These catalysts are used customarily in amounts of 0.0001 to 0.1 part by weight per 100 parts by weight of diisocyanate.

Depending on viscosity, the reaction may be carried out in bulk or in the presence of suitable solvents, solvent mixtures, or other suitable carrier media. Suitable solvents or carrier media are all those which under the selected reaction conditions are unreactive or whose reactivity with respect to the reaction partners is negligible, and in which the reactants and the reaction products are at least partly soluble. They include, for example, hydrocarbons such as toluene, xylene, aliphatic and/or cycloaliphatic petroleum fractions, chlorinated hydrocarbons such as chloroform, trichlorethane, cyclic and acyclic ethers such as dioxane, tetrahydrofuran, polyalkylene glycol dialkyl ethers, such as dipropylene glycol dimethyl ether, esters of mono-, di- or polycarboxylic acids such as ethyl acetate, butyl acetate, butyrolactone, dimethyl 2-methylglutarate, triacetin, phthalates or other plasticizers, dicarboxylic or polycarboxylic esters, dialkyl esters of $C_2$-$C_4$ dicarboxylic acids that are referred to as "Dibasic Esters", alkyl glycol esters such as ethyl glycol acetate, methoxypropyl acetate, ketones such as methyl isobutyl ketone, cyclohexanone, acetone, acid amides such as dimethylformamide, N-methylpyrrolidone, and the like.

The uretdione compounds of the general formula (III) are obtained by reaction of Y—OH with uretdione group-containing diisocyanates as described in EP 1 593 700.

Uretdione-containing diisocyanates are described for example in EP 0 795 569. The preparation of these uretdione diisocyanates is described in, for example, DE 1 670 720, EP 45 995, EP 99 976, EP 1 174 428, and in the literature cited therein. The uretdione-containing diisocyanates are preferably cyclic dimerization products of 1,4-diisocyanatobutane, hexamethylene diisocyanate (HDI), 2-methyl-1,5-diisocyanatopentane, 1,5-diisocyanato-2,2-dimethylpentane, 2,2,4- or 2,4,4-trimethyl-1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, tolylene diisocyanate (TDI), 1-isocyanato-1-methyl-4(3)isocyanatomethylcyclohexane, bisisocyanatomethylnorbornane, and 1,3- and 1,4-bis(2-isocyanatoprop-2-yl)benzene (TMXDI), or mixtures of such diisocyanates. Especially preferred uretdione-containing diisocyanates here are cyclic dimerization products of hexamethylene diisocyanate (HDI), isophorone diisocyanate (IPDI), and tolylene diisocyanate (TDI).

In this context it is possible to use the catalysts or solvents stated for the synthesis of the isocyanate adduct (II), and the temperature ranges indicated there are applicable.

Compounds of the General Formula (V):

Suitable compounds of the general formula (V) include, for example, those compounds which are prepared by reaction of dicarboxylic acids and also their esterifiable derivatives such as anhydrides, acyl chlorides or dialkyl esters, for example, such as dimethyl esters or diethyl esters, with Y—OH or with diols and monofunctional carboxylic acids. The formation of dihydroxy polyesters can be suppressed as and when required, by using correspondingly stoichiometric amounts of monofunctional carboxylic acids. The esterification may be carried out in bulk or else by azeotropic esterification in the presence of an azeotrope former. Condensation reactions of this kind are carried out at temperatures from about 50° C. to 250° C., for example.

Examples of dicarboxylic acids which can be used accordingly are succinic acid, maleic acid, fumaric acid, glutaric acid, adipic acid, sebacic acid, pimelic acid, phthalic acid, or dimerized fatty acids and their isomers, and also their hydrogenation products.

Examples of diols which can be used accordingly are: ethylene glycol, 1,2-propanediol, 1,3-propanediol, 1,4-butanediol, 1,6-hexanediol, neopentyl glycol, cis-1,2-cyclohexanedimethanol, trans-1,2-cyclohexanedimethanol, and also polyglycols based on ethylene glycol and/or propylene glycol.

Monocarboxylic acids used accordingly as an initiating component possess preferably 1 to 42, more particularly 4 to 18, more preferably 8 to 14 carbon atoms and may be saturated or unsaturated, aliphatic or aromatic, linear, branched and/or cyclic.

Examples of correspondingly suitable monocarboxylic acids are stearic acid, isostearic acid, oleic acid, lauric acid, and benzoic acid. Other suitable acids are the tertiary saturated monocarboxylic acids also referred to as Koch acids, such as 2,2-dimethylpropanoic acid, 2,2-dimethylbutanoic acid, 2,2-dimethylpentanoic acid, tert-nonanoic acid and neodecanoic acid. As commercial products, Koch acids of this kind are also known, for example, under the designations Versatic® acids (Momentive), neo acids (Exxon) or CeKanoic acids (Kuhlmann). Suitable examples are the Versatic® acids 5, 6, 9, 10, 913, 1019 from Momentive.

The compound of the general formula (V) is usually in the form of polyester compounds having in each case at least 5, preferably in each case 6 to 70, ester groups.

Ester groups typically improve the solubility.

According to specific embodiments of the invention, the compounds of the formula (V) also have ether groups.

The compounds of the formula (V) preferably have in each case exactly one carboxyl group, and the compounds of the formula (V) preferably in each case contain no further functional groups which react during the reaction with the polyamine PA or with a modified polyamine PA.

Frequently at least 50 wt %, preferably 70 to 100 wt %, of the compounds of the formula (V) that are used are present in the form of linear, monocarboxy-functional polyesters, which preferably in each case have a number-average molecular weight ($M_n$) of 500 to 10 000, preferably of 800 to 8000.

Number-average molecular weights ($M_n$) of less than 500 or greater than 10 000 frequently impair the universal compatibility.

Particularly suitable polyesters are those which can be obtained by polycondensation of one or more, optionally alkyl-substituted, hydroxycarboxylic acids such as ricinoleic acid or 12-hydroxystearic acid and/or ring-opening polymerization of the corresponding lactones, such as propiolactone, valerolactone, caprolactone in the presence of monocarboxylic acids. The lactone polymerization is carried out by known methods, initiated by p-toluenesulfonic acid or dibutyltin dilaurate, for example, at temperatures from about 50° C. to 200° C. Particularly preferred are polyesters based on ε-caprolactone, optionally in combination with δ-valerolactone.

Compounds of the General Formula (VI):

The compounds of the general formula (VI) are phosphoric esters. These compounds are usefully prepared by the reaction of at least one hydroxyl group, preferably exactly one hydroxyl group, of Y—OH with an ester-forming phosphorus compound. The compounds of the formula (VI) preferably have in each case exactly one phosphate group, and the compounds of the formula (VI) preferably in each case contain no further functional groups which react with amine groups and/or hydroxyl groups during the reaction with the polyamine PA or with a modified polyamine PA.

An ester-forming phosphorus compound is understood to be a compound which can form phosphoric esters by reaction with a compound comprising hydroxyl groups. Examples of ester-forming phosphorus compounds which can be used include polyphosphoric acid, phosphorus pentoxide, phosphorus oxychloride, and acetyl phosphate. Preference is given to using polyphosphoric acid or phosphorus pentoxide, more preferably polyphosphoric acid. With polyphosphoric acid, monoesters are predominantly formed, and with phosphorus pentoxide, monoester/diester mixtures are predominantly formed. The monoesters are preferred. It is also possible for a mixture of different components for phosphorylation to be used in the phosphorylation reaction.

The reaction of the ester-forming phosphorus compounds with the hydroxyl compounds Y—OH takes place preferably without solvents at temperatures up to 150° C., preferably below 100° C. The reaction may alternatively be carried out in the presence of suitable inert solvents (methoxypropyl acetate, for example).

Monofunctionality in the compounds of the formula (V) and (VI) is desired in order to avoid crosslinking, which usually leads to impaired solubility, poorer compatibility, excessive viscosities, and/or excessively low compatibility.

The reaction of the polyamine PA or of a modified polyamine PA with the isocyanate adduct (II) takes place under the conditions stated for the preparation of the compounds (II) and (III). The molar ratio of the isocyanate groups of the compound (II) to the reactive groups of the polyamine PA or of a modified polyamine PA is in the range from 0.1 to 1 to 1 to 1. In the context of this reaction, the reactive groups of the polyamine PA or of a modified polyamine PA include primary and secondary amino groups and also alcohol groups.

The conditions applicable to the reaction of the polyamine PA or of a modified polyamine PA with the uretdione (III) are the same as those specified for the preparation of the compounds (II) and (III). In the case of the preferred reaction regime, no catalyst is used and the temperature range lies between room temperature and 100° C. The molar ratio of the uretdione groups of the compound (III) to the reactive groups of the polyamine PA or of a modified polyamine PA is in the range from 0.1 to 1 to 1 to 1. In the context of this reaction, the reactive groups of the polyamine PA or of a modified polyamine PA include primary and secondary amino groups and also alcohol groups.

The Michael addition of the acrylates (IV) takes place in a temperature range from room temperature to 150° C., preferably to 100° C., more preferably 70° C. in the presence of a solvent or in bulk.

The molar ratio of the acrylate groups of the compound (IV) to the reactive groups of the polyamine PA or of a modified polyamine PA is preferably from 0.1 to 1 to 1 to 1. In the context of this reaction, reactive groups of the polyamine PA or of a modified polyamine PA are considered to be primary and secondary amino groups.

Reactions with Compounds of the General Formulae (V), (VI) and (VII):

The reaction of the compounds of the general formulae (V), (VI), and (VII) with polyamine PA or with a modified polyamine PA takes place in a temperature range from room temperature to 200° C., preferably to 150° C., more preferably to 120° C., in the presence of a solvent or in bulk.

In the case of the reaction of the polyamines PA or of the modified polyamines PA with the compounds of the formula (V), salt formation and/or amide formation is possible depending on reaction regime. Salt formation takes place under mild reaction conditions between the acid groups in the compounds of the formula (V) and the nitrogen atoms of the primary, secondary, and tertiary amino groups of polyamines. Amide formation is possible only in the case of primary and secondary amino groups, and takes place with elimination of water under more drastic reaction conditions such as higher temperatures and/or longer reaction times than in the case of salt formation.

Salt formation requires temperatures below 150° C.; frequently, temperatures of 120° C. are used, and reaction at temperatures lower than 100° C. is preferred. Amide formation, in contrast, proceeds with elimination of water and at temperatures of at least 100° C., frequently at 150° C. or even at temperatures of up to 200° C. In these reactions, it is also possible for mixtures of salification products and amides to be formed.

The reaction of the polyamines PA or of the modified polyamines PA with the compounds of the formulae (VI) and (VII) takes place with salt formation.

The reaction is usefully carried out in weight ratios of polyamine to the compounds of the formulae (V), (VI), and (VII) of 1 to 500 to 1 to 1, preferably 1 to 200 to 1 to 5, and more preferably 1 to 100 to 10 to 1. A low fraction of the polyamine frequently results in low levels of adsorption on surfaces of solids, and a high fraction of the polyamine may often imply poor solubility and difficulties in terms of manageability.

The lactone polymerization described under (b) in the presence of the polyamine PA or of a modified polyamine PA takes place under the conditions stated for the preparation of the polyesters Y—OH, catalyzed by, for example, p-toluenesulfonic acid or dibutyltin dilaurate, at temperatures from about 50° C. to 200° C. Particularly preferred are polyesters based on ε-caprolactone, optionally in combination with δ-valerolactone.

Depending on area of application, the solvents used for synthesis may remain in the reaction mixture, or are wholly or partly removed and, optionally, replaced by other solvents or carrier media. The solvent may be wholly or partly removed, for example, by distillation, optionally under reduced pressure and/or azeotropically with addition of water. The active substance can alternatively be isolated by precipitation, by addition of nonsolvents such as aliphatic hydrocarbons, such as hexane, and subsequent removal by filtration and, optionally, drying. The active substance obtained by one of these methods can then be diluted in a solvent suitable for the particular field of use, or, optionally, can be used in pure form, in the case of powder coatings, for example, or can be applied to inert carriers. For applications which prefer the use of solids, such as powder coatings or certain plastics processing methods, the compounds may also be converted into a solid form by further known methods. Examples of such methods are microencapsulation, spray drying, adsorption onto a solid carrier such as $SiO_2$, or the PGSS method (Particle from Gas Saturated Solutions).

The polymers of the invention may be partly or fully salified with acids. Examples of acids are carboxylic acids, phosphoric acid, phosphoric esters of polyether, polyesters or polyether-polyester block copolymers, and sulfonic acids.

Moreover, the tertiary amines of the compounds of the invention may be converted into corresponding quaternary ammonium salts in alkylation reactions with alkyl halides, such as with benzyl chloride, methyl iodide, or with oxiranes, such as alkylene oxides or glycidyl ethers, in the presence of acids, such as carboxylic acids or phosphoric acids and esters thereof.

The hydroxyl groups optionally present in the polymers of the invention may be reacted further with ester-forming phosphorus compounds such as polyphosphoric acid, for example, to form phosphoric esters.

The tertiary amines may be converted into amine oxides with oxygen, peroxo compounds such as percarboxylic acids, and with hydrogen peroxide, and the amine oxides can then be additionally salified with acids such as hydrochloric acid, for example.

The invention also relates to a dispersion which comprises a dispersing medium and also dispersed particulate solid, which is present preferably in the form of an inorganic filler, and/or in the form of an organic or inorganic pigment and/or in the form of carbon nanotubes and/or in the form of graphenes, with 0.1-10 wt %, preferably 0.3 to 4.5 wt %, of the polymer PAS of the invention being used as wetting agent and dispersant, based on the total weight of the dispersion.

The dispersion of the invention is preferably in the form of a liquid ink or coating materials, especially as paint or varnish.

The invention, moreover, also relates to a particle preparation comprising 30.0 to 99.9 wt % of particulate solid and 0.1-70.0 wt % of the polymer PAS of the invention.

The invention relates, lastly, to the use of the polymer PAS of the invention as wetting agent and dispersant.

The polymer PAS of the invention is used in particular in known fields of use of dispersants, as for example in the production or processing of paints and varnishes, of printing inks, of paper coating, of leather colors and textile colors, of pastes, of pigment concentrates, of ceramics, or of cosmetic preparations, and especially when these products include solids, such as pigments and/or fillers.

The polymer PAS of the invention can also be used in the production or processing of casting compounds and/or molding compounds based on synthetic, semisynthetic or natural macromolecular substances, such as polyvinyl chloride, saturated or unsaturated polyesters, polyurethanes, polystyrene, polyacrylate, polyamide, epoxy resins, polyolefins, such as polyethylene or polypropylene. Corresponding polymers can be used, for example, for producing casting compounds, PVC plastisols, gelcoats, polymer concrete, printed circuit boards, industrial paints, wood and furniture varnishes, vehicle finishes, marine paints, anticorrosion paints, can coatings and coil coatings, decorating paints, and architectural paints. Examples of customary binders are resins based on polyurethane, cellulose nitrate, cellulose acetobutyrate, alkyd, melamine, polyester, chlorinated rubber, epoxide, and acrylate. Examples of water-based coatings are cathodic or anodic electrodeposition coating systems for automobile bodies, for example. Further examples are renders, silicate paints, emulsion paints, waterborne paints based on water-thinnable alkyds, alkyd emulsions, hybrid systems, 2-component systems, polyurethane dispersions, and acrylate dispersions.

The polymers PAS of the invention are especially suitable also as dispersants for producing solids concentrates, such as pigment concentrates. For this purpose, for example, the polymers PAS are introduced in a carrier medium, such as organic solvents, plasticizers and/or water, and the solids for dispersal are added with stirring. These concentrates may additionally comprise binders and/or other auxiliaries. With the polymers PAS of the invention, however, it is possible in particular to produce stable, binder-free pigment concentrates. It is also possible with the polymers to produce flowable solids concentrates from pigment presscakes. In this case, the polymers of the invention are admixed to the presscake, which may still comprise organic solvents, plasticizers and/or water, and the resulting mixture is dispersed. The solids concentrates produced in various ways can then be incorporated into a variety of substrates, such as alkyd resins, polyester resins, acrylate resins, polyurethane resins, or epoxy resins, for example. Pigments, however, can also be dispersed solventlessly directly into the polymers PAS of the invention, and are then suitable especially for pigmenting thermoplastic and thermoset plastic formulations.

The polymers PAS of the invention can also be used advantageously in the production of inks for "non-impact" printing processes such as "thermal inkjet" and the "bubble-jet process". These inks may be, for example, aqueous ink formulations, solvent-based ink formulations, solvent-free or low-solvent inks for UV applications, and waxlike inks.

The polymers PAS of the invention may also be used advantageously in the production of color filters for liquid-crystal displays, liquid-crystal screens, color resolution devices, sensors, plasma screens, displays based on SED (Surface conduction Electron emitter Display) and for MLCC (Multi Layer Ceramic Compounds). In this case the liquid color filter varnish, also called color resist, can be applied by any of a wide variety of application processes such as spin coating, knife coating, combination of the two, or via "non-impact" printing processes such as inkjet processes, for example. The MLCC technology is used in the production of microchips and printed circuit boards.

The polymers PAS of the invention can also be used for producing cosmetic preparations such as, for example, makeup, powder, lipsticks, hair colorants, creams, nail varnishes, and sun protection products. These products may be present in the usual forms, such as W/O or O/W emulsions, solutions, gels, creams, lotions or sprays, for example. The polymers of the invention can be used advantageously in dispersions that are used for producing these preparations. These dispersions may comprise the carrier media that are customary in cosmetology for these purposes, such as water, castor oils or silicone oils, and solids, examples being organic and inorganic pigments, such as titanium dioxide or iron oxide.

A dispersant of this kind may also be used, lastly, for producing a pigmented coating on a substrate, in which case the pigmented paint is applied to the substrate and the pigmented paint applied to the substrate is baked or cured, or crosslinked.

The polymers PAS of the invention can be used alone or together with customary binders. In the case of use in polyolefins, it may be advantageous, for example, to use corresponding low molecular weight polyolefins as carrier materials together with PAS.

Another possible use of the polymer PAS of the invention lies in the production of dispersible solids in powder particle and/or fiber particle form, more particularly of dispersible pigments or polymeric fillers, in which case the particles are coated with PAS. Coatings of this kind of organic and inorganic solids are performed in a known way. The solvent or emulsion medium in this case may either be removed or may remain in the mixture, to form pastes. These pastes are customary commercial products and may additionally comprise binder fractions and also further auxiliaries and adjuvants. Especially in the case of pigments, the coating of the pigment surface may take place during or after the synthesis of the pigments, by addition of PAS to the pigment suspension, for example, or during or after pigment conditioning. The pigments pretreated in this way are notable for greater ease of incorporation and also for improved viscosity, flocculation, and gloss characteristics, and for greater color strength by comparison with untreated pigments.

Examples of pigments are mono-, di-, tri- and polyazo pigments, oxazine, dioxazine, and thiazine pigments, diketopyrrolopyrroles, phthalocyanines, ultramarine, and other metal complex pigments, indigoid pigments, diphenylmethane, triarylmethane, xanthenes, acridine, quinacridone, methine pigments, anthraquinone, pyranthrone, perylene and other polycyclic carbonyl pigments. Further examples of organic pigments are found in the following monograph: W. Herbst, K. Hunger "Industrial Organic Pigments", 1997 (publisher: Wiley-VCH, ISBN: 3-527-28836-8). Examples of inorganic pigments are pigments based on carbon black, graphite, zinc, titanium dioxide, zinc oxide, zinc sulfide, zinc phosphate, barium sulfate, lithopone, iron oxide, ultramarine, manganese phosphate, cobalt aluminate, cobalt stannate, cobalt zincate, antimony oxide, antimony sulfide, chromium oxide, zinc chromate, mixed metal oxides based on nickel, bismuth, vanadium, molybdenum, cadmium, titanium, zinc, manganese, cobalt, iron, chromium, antimony, magnesium, aluminum (examples being nickel titanium yellow, bismuth vanadate molybdate yellow, or chromium titanium yellow). Further examples are cited in the following monograph: G. Buxbaum, "Industrial Inorganic Pigments", 1998 (publisher: Wiley-VCH, ISBN: 3-527-28878-3). Inorganic pigments may also be magnetic pigments based on pure iron, iron oxides and chromium oxides or mixed oxides, metallic effect pigments composed of aluminum, zinc, copper or brass, and pearlescent pigments, fluorescent and phosphorescent luminous pigments. Further examples are nanoscale organic or inorganic solids with particle sizes of below 100 nm, such as particular types of carbon black, or particles consisting of a metal or a semimetal oxide and/or hydroxide, and also particles which consist of mixed metal and/or semimetal oxides and/or hydroxides. For example, the oxides and/or oxide hydroxides of aluminum, of silicon, of zinc, of titanium, etc., can be employed for producing extremely finely divided solids of this kind. The process by which these oxidic and/or hydroxidic and/or oxide-hydroxidic particles are produced may take place via any of a wide variety of methods such as, for example, ion exchange operations, plasma operations, sol-gel processes, precipitation, comminution (by grinding, for example) or flame hydrolysis, etc. These nanoscale solids may also be what are called hybrid particles, consisting of an inorganic core and an organic shell—or vice versa.

Examples of fillers in powder or fiber form are, for example, those which are constructed from particles in powder or fiber form of aluminum oxide, aluminum hydroxide, silicon dioxide, kieselguhr, siliceous earth, quartz, silica gel, talc, kaolin, mica, perlite, feldspar, finely ground slate, calcium sulfate, barium sulfate, calcium carbonate, calcite, dolomite, glass, polyvinylidene fluoride (PVDF), or carbon. Further examples of pigments or fillers are found, for example, in EP-A-0 270 126. Flame retardants as well, such as aluminum or magnesium hydroxide, and matting agents such as silicas, for example, are likewise amenable to effective dispersal and stabilization.

The polymer PAS of the invention, moreover, can also be used as emulsifier, phase mediator (liquid/liquid compatibilizer) or adhesion promoter.

The invention is elucidated in more detail below by means of working examples.

WORKING EXAMPLES

In the text below, the invention is illustrated using examples. Unless otherwise noted, the figures in parts are parts by weight and figures in percent are percentages by weight.

Measurement Methods:

In the case of molecularly nonuniform substances, the reported molecular weights—below as in the description above—represent average values of the numerical mean. The molecular weights or number-average molecular weights ($M_n$) are determined, when determinable functional end groups are present, such as hydroxyl, NCO, amino, or acid groups, by end-group determination, via the determination of OH number, NCO number, amine number, and acid number, respectively, by means of titration. In the case of compounds to which end-group determination cannot be applied, the number-average molecular weight is determined by means of gel permeation chromatography against a polystyrene standard.

Solids Content

The sample (2.0±0.1 g of substance under test) is weighed out into an aluminum dish which has been dried beforehand, and is dried in a drying cabinet at 150° C. for 10 minutes, cooled in a desiccator, and then weighed again. The residue corresponds to the solids fraction.

OH Number

Alcoholic hydroxyl groups are reacted by acetylation with an excess of acetic anhydride. The excess acetic anhydride is then cleaved by addition of water to give acetic acid, and back-titration takes place using ethanolic KOH. The OH number indicates the amount of KOH in mg which is equivalent to the amount of acetic acid bound in the acetylation of 1 g of substance.

Acid Number

The acid number (AN) refers to the amount of KOH in mg which is needed in order to neutralize 1 g of substance under the specified conditions. The acid number is determined according to DIN EN ISO 2114 by a neutralization reaction with 0.1 N KOH in ethanol as titrant:

Amine Number

The amine number (AmN) refers to the amount of KOH in mg which corresponds to the amine fraction of 1 g of substance. The amine number is determined according to DIN 16945 by a neutralization reaction with 0.1 N perchloric acid in acetic acid as titrant:

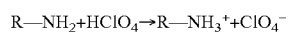

The additions of inert solvents, such as cyclohexane, dioxane, chlorobenzene, acetone, and methyl ethyl ketone, may improve the titration of very weak bases.

NCO Number

The free NCO content of the polyisocyanates employed and also the course of the NCO addition reactions is determined according to EN ISO 9369 by reaction with butylamine and subsequent titration of the amine excess. These methods are also described in Saul Patai "The Chemistry of Cyanates and their Thioderivatives", Part 1, Chapter 5, 1977.

Gel Permeation Chromatography (GPC)

The gel permeation chromatography was carried out at 40° C. with a high-pressure liquid chromatography pump (Bischoff HPLC 2200) and a refractive index detector (Waters 419). The eluent used was tetrahydrofuran, with an elution rate of 1 ml/min. The calibration was performed using polystyrene standards. The number-average molecular weight ($M_n$), the weight-average molecular weight ($M_w$), and the polymolecularity index $PMI=M_w/M_n$ were calculated using the NTeqGPC program.

Syntheses:
General Preparation Protocols for the Polyamines PA Under Option 1:
General Preparation Protocol (Option 1, Method a):

A four-neck flask equipped with water separator, stirrer, thermometer, and nitrogen inlet tube is charged with the stated amount of amine A. With waterbath cooling and with stirring, the stated amount of water is metered in, with the temperature not exceeding 80° C. After cooling to room temperature has taken place, the stated amount of acrylate is metered in, the temperature not exceeding 50° C. The reaction vessel is optionally cooled with a waterbath. The reaction is monitored via 1H-NMR. When all of the double bonds have undergone reaction, the temperature is raised to 80° C. and the reaction mixture is stirred at 80° C. for approximately three 20 hours. Thereafter the alcohol formed and the water used as solvent are removed at 80° C. and 20 mbar. This produces still more alcohol, which is removed. The reaction is monitored via IR spectroscopy. As soon as the IR spectrum shows the full conversion of the esters, the reaction is deemed to be at an end.

General Preparation Protocol (Option 1, Method b):

A four-neck flask equipped with water separator, stirrer, thermometer, and nitrogen inlet tube is charged with the stated amount of amine A. With stirring, the stated amount of ethanol is added, and the temperature rises somewhat. After cooling to room temperature has taken place, the stated amount of acrylate is metered in, the temperature not exceeding 50° C. The reaction vessel is optionally cooled with a waterbath. The reaction is monitored via 1H-NMR. When all of the double bonds have undergone reaction, the temperature is raised to 80° C. and the reaction mixture is stirred at 80° C. and 500 mbar for approximately three hours. Thereafter the temperature is raised successively to 145° C. and the pressure is lowered to 300 mbar. The ethanol used as solvent and the alcohol formed are removed from the reaction mixture. The reaction is monitored via IR spectroscopy. As soon as the IR spectrum shows the full conversion of the esters, the reaction is deemed to be at an end.

General Preparation Protocol (Option 1, Method c):

A four-neck flask equipped with water separator, stirrer, thermometer, and nitrogen inlet tube is charged with the stated amount of amine A. With stirring, the stated amount of acrylate is added, with the temperature not exceeding 50° C. The reaction vessel is optionally cooled with a waterbath. The reaction is monitored via 1H-NMR. When all of the double bonds have undergone reaction, the temperature is raised to 100° C. and the reaction mixture is stirred at 100° C. for approximately two hours. Thereafter the temperature is raised to 130° C. and the pressure is lowered to 300 mbar. The alcohol formed is removed from the reaction mixture. The reaction is monitored via IR spectroscopy. As soon as the IR spectrum shows the full conversion of the esters, the reaction is deemed to be at an end.

Option 1—Preparation Example PA23*

Step 1:

A four-neck flask equipped with water separator, stirrer, thermometer, and nitrogen inlet tube is charged with 44.1 parts of diethanolamine (amine A) together with 15.9 parts of ethanol, and this initial charge is homogenized. Then 40.0 parts of ethyl acrylate are metered in, the temperature being 35-40° C. The reaction is monitored via 1H-NMR. When all of the double bonds have undergone reaction, the ethanol is removed from the reaction mixture at 60° C. and with successive reduction in the pressure from 500 mbar to 200 mbar. This "$CG_h$ building block" can be subjected to polycondensation immediately after its preparation, or else stored for later use.

*not listed in Table 1.

Step 2:

A four-neck flask equipped with water separator, stirrer, thermometer, and nitrogen inlet tube is charged with 6.71 g of 1,1,1-trimethylolpropane and this initial charge is heated to 135° C. with stirring. Via a dropping funnel, 31.57 g of the $CG_h$ building block are added dropwise together with 0.039 g of tetrabutyl titanate, and the ethanol formed is removed by distillation. When no further formation of ethanol can be observed, a further 73.68 g of the $CG_h$ building block are added together with 0.074 g of tetrabutyl titanate. The reaction mixture is heated to 140° C. and stirred until further formation of ethanol can no longer be observed. When no further formation of ethanol can be observed, the reaction is deemed to be at an end.

TABLE 1

Preparation examples, polyamines PA (option 1)

| No. | Acrylate | Wt % | Amine A | Wt % | Mol. ratio Acrylate/amine | Solvent | Wt % | Method |
|---|---|---|---|---|---|---|---|---|
| PA1 | Ethyl acrylate | 36.1 | Diethylenetriamine | 44.7 | 5/6 | H$_2$O | 19.2 | a |
| PA2 | Ethyl acrylate | 38.9 | Diethylenetriamine | 43.2 | 13/14 | EtOH | 17.9 | b |
| PA3 | Ethyl acrylate | 44.7 | Diethylenetriamine | 55.3 | 5/6 | — | — | c |
| PA4 | Ethyl acrylate | 35.2 | Diethylenetriamine | 45.4 | 4/5 | H$_2$O | 19.4 | a |
| PA5 | Ethyl acrylate | 32.6 | Hexamethylenediamine | 47.2 | 4/5 | H$_2$O | 20.2 | a |
| PA6 | Ethyl acrylate | 37.1 | Hexamethylenediamine | 44.0 | 49/50 | H$_2$O | 18.9 | a |
| PA7 | Ethyl acrylate | 28.5 | Triethylenetetramine | 50.0 | 5/6 | H$_2$O | 21.5 | a |
| PA8 | Ethyl acrylate | 30.5 | Triethylenetetramine | 53.4 | 5/6 | H$_2$O | 16.1 | a |
| PA9 | Ethyl acrylate | 26.3 | Tetraethylenepentamine | 59.7 | 5/6 | H$_2$O | 14.0 | a |
| PA10 | Ethyl acrylate | 21.9 | Jeffamin D 230 | 54.7 | 24/25 | H$_2$O | 23.4 | a |
| PA11 | Ethyl acrylate | 26.8 | Isophoronediamine | 54.9 | 5/6 | H$_2$O | 18.3 | a |
| PA12 | Ethyl acrylate | 11.6 | Priamin 1074 | 76.8 | 5/6 | H$_2$O | 11.6 | a |
| PA13 | Ethyl acrylate | 30.8 | Jeffamin EDR 148 | 55.4 | 5/6 | H$_2$O | 13.8 | a |
| PA14 | Ethyl acrylate | 36.0 | 1,3-Xylylenediamine | 51.0 | 24/25 | H$_2$O | 13.0 | a |
| PA15 | Ethyl acrylate | 28.3 | Diethylenetriamine | 36.4 | 4/5 | EtOH | 35.3 | b |
| PA16 | Ethyl acrylate | 33.5 | Diethylenetriamine | 41.0 | 5/6 | EtOH | 25.5 | b |
| PA17 | Ethyl acrylate | 38.8 | Diethylenetriamine | 42.8 | 14/15 | H$_2$O | 18.4 | a |
| PA18 | Ethyl acrylate | 41.6 | Diethylenetriamine | 43.8 | 49/50 | H$_2$O | 14.6 | a |
| PA19 | Methyl acrylate | 41.0 | Diethylenetriamine | 59.0 | 5/6 | — | — | c |
| PA20 | Ethyl acrylate | 27.8 | Tetraethylenepentamine | 57.8 | 14/15 | H$_2$O | 14.4 | a |
| PA21 | Ethyl acrylate | 39.7 | Diethylenetriamine | 42.6 | 27/28 | EtOH | 17.7 | b |
| PA22 | Ethyl acrylate | 45.0 | Diethylenetriamine | 37.0 | 5/4 | EtOH | 18.0 | b |

The preparation of the uretdione-containing intermediates of the general formula (III) (i.e., products of the reaction between uretdione-containing polyisocyanates and compounds of formula Y—OH) takes place as described for example in DE 10 2004 022 753.

Preparation of the Uretdione Compounds of the General Formula (III):

The preparation of the hydroxyl-functional lactone polyesters takes place as described for example in EP 158678.

Preparation of Polyester 1 (OH Number: 47 mg KOH/g):

In a four-neck flask equipped with reflux condenser, stirrer, thermometer, nitrogen inlet tube, 20.3 parts of hexadecanol and 79.7 parts of ε-caprolactone are homogenized, admixed with 200 ppm of dibutyltin dilaurate, and heated to 170° C. The mixture is stirred at this temperature until a solids content of >97% is reached. The resulting polyester has an OH number of 47 mg KOH/g.

The preparation of polyesters 2-6 takes place as described for the preparation of polyester 1. The polyesters prepared are listed in the table below.

TABLE 2

| Polyesters | | | | | |
|---|---|---|---|---|---|
| Polyester | Alcohol | Wt % | ε-Caprolactone wt % | ε-Valerolactone wt % | OH number mg KOH/g |
| 1 | n-Hexadecanol | 20.3 | 79.7 | — | 47 |
| 2 | MPEG 350 | 48.4 | 51.6 | — | 78 |
| 3 | n-Decanol | 14.4 | 85.6 | — | 51 |
| 4 | MPEG 500 | 57.1 | 42.9 | — | 64 |
| 5 | n-Decanol | 19.5 | 80.5 | — | 69 |
| 6 | n-Decanol | 8.2 | 71.1 | 20.7 | 29 |

MPEG 350 = methoxypolyethylene glycol, OH number: 348 mg KOH/g
MPEG 500 = methoxypolyethylene glycol, OH number: 112 mg KOH/g General Preparation Protocol for the Uretdione Intermediates of the General Formula (III):

In a four-neck flask equipped with reflux condenser, stirrer, thermometer, and nitrogen inlet tube, the stated amount of polyisocyanate is mixed with the amounts of the stated components reported for the respective intermediate. The mixture is then heated to 80° C., 200 ppm of dibutyltin dilaurate are added, and the mixture is stirred at 80° C. until the NCO content has dropped to ≤0.1%.

TABLE 3

| Uredione intermediates of the general formula (III) | | | | | | | | |
|---|---|---|---|---|---|---|---|---|
| No. | Polyisocyanate | Wt % | Component 1 | Wt % | Component 2 | Wt % | Component 3 | Wt % | NCO conversion in % |
| I1 | HDI-U | 22.2 | Polyester 1 | 45.3 | Polyether 1 | 23.4 | n-Decanol | 9.1 | 33/17/50 |
| I2 | HDI-U | 20.3 | Polyester 2 | 15.1 | Polyether 2 | 64.6 | — | — | 20/80/— |
| I3 | HDI-U | 26.9 | Polyester 2 | 10.1 | Polyether 3 | 63.0 | — | — | 10/90/— |
| I4 | HDI-U | 20.0 | — | — | Polyether 2 | 80.0 | — | — | —/100/— |
| I5 | HDI-U | 14.9 | Polyester 2 | 11.1 | Polyether 1 | 74.0 | — | — | 20/80/— |
| I6 | HDI-U | 11.3 | Polyester 2 | 8.5 | Polyether 4 | 80.2 | — | — | 20/80/— |
| I7 | HDI-U | 18.7 | Polyester 3 | 21.4 | Polyether 2 | 59.9 | — | — | 20/80/— |
| I8 | HDI-U | 19.6 | Polyester 4 | 17.8 | Polyether 2 | 62.6 | — | — | 20/80/— |
| I9 | HDI-U | 19.9 | Polyester 5 | 16.7 | Polyether 2 | 63.4 | — | — | 20/80/— |
| I10 | HDI-U | 21.1 | Polyester 2 | 78.9 | — | — | — | — | 100/—/— |
| I11 | HDI-U | 14.1 | — | — | Polyether 1 | 78.6 | Polysiloxane 1 | 7.3 | —/90/10 |
| I12 | HDI-U | 15.6 | Polyester 6 | 78.1 | — | — | n-Decanol | 6.3 | 50/—/50 |
| I13 | HDI-U | 19.6 | Polyester 1 | 56.0 | Polyether 2 | 21.1 | MPG | 3.3 | 50/25/25 |

Key to Table 3:
HDI-U: = aliphatic HDI uretdione, Desmodur N3400, Bayer AG
Polyester 1: = hexadecanol-initiated monohydroxy-functional ε-caprolactone polyester, OH number: 47 mg KOH/g
Polyester 2: = MPEG 350-initiated monohydroxy-functional ε-caprolactone polyester, OH number: 78 mg KOH/g
Polyester 3: decanol-initiated monohydroxy-functional ε-caprolactone polyester, OH number: 51 mg KOH/g
Polyester 4: = MPEG 500-initiated monohydroxy-functional ε-caprolactone polyester, OH number: 64 mg KOH/g
Polyester 5: decanol-initiated monohydroxy-functional ε-caprolactone polyester, OH number: 69 mg KOH/g
Polyester 6: decanol-initiated monohydroxy-functional polyester of ε-caprolactone and δ-valerolactone in a molar ratio of 3:1, OH number: 29 mg KOH/g
Polyether 1: = butoxypolypropylene glycol, OH number: 47 mg KOH/g
Polyether 2: = butoxypolypropylene glycol, OH number: 73 mg KOH/g
Polyether 3: = methoxypolyethylene glycol, OH number: 112 mg KOH/g
Polyether 4: = butoxypolypropylene glycol, OH number: 33 mg KOH/g
Polysiloxane 1: = Silaplane FM-0411; monohydroxy-functional polysiloxane, Jnc America
MPG: = monophenyl glycol General Preparation Protocol for the Preparation Examples Listed in the Table Below:

General Preparation Protocols for the Reaction of the Polyamine with a Uretdione Intermediate of the General Formula (III):

A four-neck flask equipped with reflux condenser, stirrer, thermometer, and nitrogen inlet tube is charged with the stated amount of polyamine, and this initial charge is heated to 90° C. As soon as this temperature is reached, the stated amount of the uretdione intermediate is added. Depending on viscosity, the intermediate is heated for its addition. The reaction may be somewhat exothermic, but does not require cooling; the energy liberated is utilized to accelerate reaction. The reaction mixture is stirred for two hours at the autogenous temperature.

General Preparation Protocols for the Further Reaction with Component 2:

Component 2=Epoxide:

The stated amount of the epoxide is added to the reaction mixture in one portion, and the mixture is heated to 140° C. The batch is stirred at this temperature until the epoxide has fully reacted, as may be monitored via NMR measurements, for example.

Component 2=Acrylate:

The stated amount of the acrylate is added to the reaction mixture in one portion at 80° C. The reaction mixture is stirred at this temperature until the acrylate has fully reacted, as may likewise be monitored via NMR measurements, for example.

Component 2=Monoadduct:

The stated amount of the monoadduct is metered into the reaction mixture using a dropping funnel at 80° C. The reaction mixture is stirred at this temperature for three hours.

PAS12:

The stated amount of P acid 1 is metered slowly into the reaction mixture using a dropping funnel at 80° C. The reaction mixture is subsequently stirred at 100° C. for two hours.

PAS15:

The stated amount of C acid 1 is metered slowly into the reaction mixture using a dropping funnel at 80° C. The reaction mixture is subsequently stirred at 100° C. for two hours.

TABLE 4

Preparation examples

| Example No. | Polyamine | Wt % | Uretdione intermediate | Wt % | Component 2 | Wt % | Solvent | Wt % |
|---|---|---|---|---|---|---|---|---|
| PAS1 | PA2 | 13.4 | I1 | 83.2 | Epoxide 1 | 3.4 | PMA | 50.0 |
| PAS2 | PA1 | 11.4 | I2 | 79.0 | Acrylate 1 | 9.6 | — | — |
| PAS3 | PA9 | 10.6 | I5 | 80.4 | Acrylate 1 | 9.0 | — | — |
| PAS4 | PA9 | 13.5 | I2 | 74.9 | Acrylate 1 | 11.6 | — | — |
| PAS5 | PA2 | 9.4 | I5 | 87.3 | Acrylate 3 | 3.3 | — | — |
| PAS6 | PA9 | 13.3 | I9 | 75.5 | Acrylate 1 | 11.2 | — | — |
| PAS7 | PA8 | 13.8 | I2 | 74.7 | Acrylate 1 | 11.5 | — | — |
| PAS8 | PA9 | 6.8 | I3 | 28.5 | Acrylate 2 | 14.7 | PMA | 50.0 |
| PAS9 | PA1 | 10.8 | I2 | 74.4 | Acrylate 1 | 14.8 | — | — |
| PAS10 | PA9 | 13.4 | I4 | 75.3 | Acrylate 1 | 11.3 | — | — |
| PAS11 | PA2 | 12.4 | I4 | 85.4 | Epoxide 2 | 2.2 | — | — |
| PAS12 | PA16 | 9.4 | I10 | 74.3 | P acid 1 | 16.3 | — | — |
| PAS13 | PA15 | 6.9 | I11 | 89.1 | Acrylate 3 | 4.0 | — | — |
| PAS14 | PA9 | 19.2 | I3 | 80.8 | — | — | — | — |
| PAS15 | PA7 | 9.4 | I12 | 77.4 | C acid 1 | 13.2 | — | — |
| PAS16 | PA9 | 5.1 | I6 | 50.6 | Acrylate 1 | 4.3 | PMA | 40.0 |
| PAS17 | PA9 | 12.7 | I7 | 76.6 | Acrylate 1 | 10.7 | — | — |
| PAS18 | PA9 | 13.1 | I8 | 75.7 | Acrylate 1 | 11.2 | — | — |
| PAS19 | PA20 | 10.3 | I5 | 83.1 | Acrylate 3 | 6.6 | — | — |
| PAS20 | PA4 | 7.6 | I5 | 87.4 | Acrylate 3 | 5.0 | — | — |
| PAS21 | PA5 | 9.9 | I5 | 86.2 | Acrylate 3 | 3.9 | — | — |
| PAS22 | PA21 | 10.9 | I1 | 58.3 | Monoadduct M 2 | 30.8 | — | — |
| CMP1* | PEI 1200 | 13.3 | I9 | 75.5 | Acrylate 1 | 11.2 | — | — |

The asterisk "*" denotes a noninventive, comparative example

CMP:=a noninventive comparative example

Acrylate 1:=2-ethyhexyl acrylate

Acrylate 2:=polypropylene glycol monoacrylate, Blemmer AP 400, Sartomer

Acrylate 3:=n-butyl acrylate

Epoxide 1:=2-ethylhexyl glycidyl ether

Epoxide 2:=n-butyl glycid ether

PEI 1200:=polyethylenimine, Epomin SP012, Nippon Shokubai

PMA:=1-methoxy-2-propyl acetate

C acid 1=tall oil fatty acid, AN: 195 mg KOH/g

P acid 1:=phosphorylated, isotridecanol-initiated polyethylene glycol, AN: 105 mg KOH/g Monoadduct M 2:=reaction product of polyether 2 with Desmodur T 100 (see Table 7)

General Preparation Protocol for the Preparation Examples Described in the Table Below:

A four-neck flask equipped with stirrer, thermometer, reflux condenser, and nitrogen inlet tube is charged with the stated amount of polyamine together with the stated amount of ε-caprolactone and with 200 ppm of dibutyltin dilaurate, and this initial charge is heated to 170° C. with stirring and stirred at this temperature until a solids content of 98% is reached.

TABLE 5

Preparation examples

| Examples No. | Poly- amine | Amount x in [g] | Compo- nent 1 | Amount x in [g] | AmN in mg KOH/g |
|---|---|---|---|---|---|
| PAS23 | PA2 | 6.9 | ε-Capro- lactone | 93.1 | 18.2 |
| PAS24 | PA9 | 6.9 | ε-Capro- lactone | 93.1 | 22.0 |
| CMP2* | PEI 1200 | 6.9 | ε-Capro- lactone | 93.1 | 29.7 |

The asterisk "*" denotes a noninventive, comparative example
CMP: = a noninventive comparative example
PEI 1200: = polyethylenimine, Epomin SP012, Nippon Shokubai General Preparation Protocol for the Preparation Examples Described in the Table Below:

Reaction with Epoxide Components:

A four-neck flask equipped with stirrer, thermometer, reflux condenser, dropping funnel, and nitrogen inlet tube is charged with the stated amount of polyamine, which is heated to 100° C. With stirring, the stated amount of the epoxide component is slowly metered in, during which the reaction temperature ought not to exceed 120° C. This is followed by stirring at 120° C. until conversion of the epoxide component is complete. The progress of the reaction may be monitored via NMR measurements, for example.

Reaction with Acrylate Component:

The reaction of a polyamide already reacted with an epoxide component takes place in analogy to the reaction of the pure polyamine with an acrylate component. A four-neck flask equipped with stirrer, thermometer, reflux condenser, dropping funnel, and nitrogen inlet tube is charged with the stated amount of polyamine, which is heated to 60° C. The stated amount of the acrylate component is slowly metered in, during which the reaction temperature ought not to exceed 90° C. This is followed by stirring at 80° C. until conversion of the acrylate component is complete. The progress of the reaction may be monitored via NMR measurements.

Where the polyamine is reacted with an epoxide component and with an acrylate component, the reaction with the epoxide preferably takes place first.

TABLE 6

Preparation examples

| Examples No. | Polyamine | Wt % | Epoxide | Wt % | Acrylate | Wt % |
|---|---|---|---|---|---|---|
| PAS25 | PA18 | 29.3 | — | — | Acrylate 2 | 70.7 |
| PAS26 | PA3 | 29.5 | G RV 1814 | 10.9 | Acrylate 2 | 59.6 |
| PAS27 | PA6 | 39.9 | — | — | Acrylate 2 | 60.1 |
| PAS28 | PA10 | 46.8 | — | — | Acrylate 2 | 53.2 |
| PAS29 | PA17 | 37.6 | n-BGE | 7.0 | Acrylate 2 | 55.4 |
| PAS30 | PA13 | 43.0 | — | — | Acrylate 2 | 57.0 |
| PAS31 | PA11 | 45.4 | — | — | Acrylate 2 | 54.6 |
| PAS32 | PA12 | 57.6 | — | — | Acrylate 2 | 42.4 |
| PAS33 | PA19 | 36.2 | G RV 1814 | 16.9 | Acrylate 4 | 46.9 |
| PAS34 | PA22 | 47.7 | — | — | Acrylate 2 | 52.3 |
| PAS35 | PA14 | 24.2 | — | — | Acrylate 2 | 47.7 |

Acrylate 4: = polyethylene glycol monoacrylate, Blemmer AE 200, Sartomer
G RV 1814: = C13-C15 alkyl glycidyl ether, Grilonit RV 1814, Ems-Chemie AG
n-BGE = n-butyl glycidyl ether
Acrylate 2: = polypropylene glycol monoacrylate, Blemmer AP 400, Sartomer General Preparation Protocol for the Isocyanate Adducts of the General Formula (II):

A four-neck flask equipped with stirrer, thermometer, dropping funnel, reflux condenser, and nitrogen inlet tube is charged with 33.4 g of Desmodur T 100 (TDI 100, NCO content=48.8 wt %) and 0.57 g of benzoyl chloride, and these components are thoroughly mixed. The stated amount of the alcohol component, which is water-free and in the case of polyethers is alkali-free, is metered in slowly, the temperature not exceeding 55° C. Following the metered addition, the mixture is stirred at 55° C. for three hours more. The excess TDI is removed from the reaction mixture using a thin-film evaporator at 150° C.

TABLE 7

Isocyanate adducts of the general formula (II) (monoadducts)

| Monoadduct | Addition of | Amount x in [g] |
|---|---|---|
| M 1 | Polyester 4 | 67.9 |
| M 2 | Polyether 2 | 59.6 |
| M 3 | Polyether 4 | 131.8 |

Polyester 4: = MPEG 500-initiated monohydroxy-functional ε-caprolactone polyester, OH number: 64 mg KOH/g
Polyether 2: = butoxypolypropylene glycol, OH number: 73 mg KOH/g
Polyether 4: = butoxypolypropylene glycol, OH number: 33 mg KOH/g General Preparation Protocol for the Preparation Examples Described in the Table Below:

Reaction with Epoxide Components:

A four-neck flask equipped with stirrer, thermometer, reflux condenser, dropping funnel, and nitrogen inlet tube is charged with the stated amount of polyamine, which is heated to 100° C. With stirring, the stated amount of the epoxide component is slowly metered in, during which the reaction temperature ought not to exceed 120° C. This is followed by stirring at 120° C. until conversion of the epoxide component is complete. The progress of the reaction may be monitored via NMR measurements, for example.

Reaction with Acrylate Components:

A four-neck flask equipped with stirrer, thermometer, reflux condenser, dropping funnel, and nitrogen inlet tube is charged with the stated amount of polyamine, which is heated to 60° C. The stated amount of the acrylate component is slowly metered in, during which the reaction temperature ought not to exceed 100° C. This is followed by stirring at 80° C. until conversion of the acrylate component is complete. The progress of the reaction may be monitored via NMR measurements.

Reaction with Glycerol Carbonate:

A four-neck flask equipped with stirrer, thermometer, reflux condenser, dropping funnel, and nitrogen inlet tube is charged with the stated amount of polyamine, which is heated to 80° C. The stated amount of the glycerol carbonate is metered in slowly. This is followed by stirring at 80° C. until conversion of the glycerol carbonate is complete. The progress of the reaction may be monitored via NMR measurements.

Reaction with ε-Caprolactone:

A four-neck flask equipped with stirrer, thermometer, reflux condenser, dropping funnel, and nitrogen inlet tube is charged with the stated amount of polyamine, which is heated to 80° C. The stated amount of the ε-caprolactone is added. This is followed by stirring at 80° C. for two hours.

Reaction with Monoadducts:

If not only the amino groups but also the hydroxyl groups, generated with component 1 or already present in the polyamine PA, are to be reacted with an isocyanate adduct of the general formula (II) (monoadduct), the reaction takes place with addition of 200 ppm of dibutyltin dilaurate;

otherwise, the preparation protocol corresponds to the reaction of a hydroxyl group-free polyamide with a monoadduct (component 2).

A four-neck flask equipped with stirrer, thermometer, reflux condenser, dropping funnel, and nitrogen inlet tube is charged with the stated amount of polyamine, and this initial charge is heated to 50° C. The stated amount of monoadduct is metered in slowly, with the reaction temperature not exceeding 55° C. The reaction mixture is subsequently stirred at 70° C. for 2 hours more.

TABLE 8

| Examples No. | Polyamine | Wt % | Comp. 1 | Wt % | Comp. 2 | Wt % |
|---|---|---|---|---|---|---|
| PAS36 | PA8 | 15.2 | Grilonit RV 1814 | 13.0 | M 1 | 71.8 |
| PAS37 | PA8 | 19.1 | — | — | M 2 | 80.9 |
| PAS38 | PA8 | 15.2 | — | — | M 1 | 84.8 |
| PAS39 | PA16 | 15.5 | Grilonit RV 1814 | 10 | M 1 | 74.5 |
| PAS40 | PA16 | 8.3 | — | — | M 3 | 91.7 |
| PAS41 | PA16 | 13.0 | ε-Caprolactone | 6.4 | M 1 | 80.6 |
| PAS42 | PA16 | 12.8 | 4-Hydroxybutyl acrylate | 7.9 | M 1 | 79.3 |
| PAS43 | PA16 | 14.5 | Glycerol carbonate | 3.0 | M 2 | 82.5 |
| PAS44 | PA23 | 12.3 | — | — | M 2 | 87.6 |

Comp.: = component
Grilonit RV 1814: = C13-C15 alkyl glycidyl ether, Ems-Chemie AG General Preparation Protocol for the Reaction of Amines A with Polyfunctional Acrylates and/or Epoxides to Give Polyamines PA Under Option 3:

General Preparation Protocol (Option 3, Method a):

A four-neck flask equipped with stirrer, thermometer, reflux condenser, and nitrogen inlet tube is charged with the amine A R1a) as per the table, with the solvent (LM) listed where appropriate. Under N2 gas, the reaction components R1b) and R1c) are metered in slowly with stirring, during which the reaction temperature ought not to exceed 100° C. This is followed by an after-reaction of two hours at 100° C.

General Preparation Protocol (Option 3, Method b):

A four-neck flask equipped with stirrer, thermometer, reflux condenser, and nitrogen inlet tube is charged with the amine A R1a) as per the table, with the solvent (LM) listed where appropriate and this initial charge is heated to 100° C. Under N2 gas, the reaction components R1b) and R1c) are metered in slowly with stirring, during which the reaction temperature ought not to exceed 120° C. This is followed by an after-reaction of one hour at 110° C.

TABLE 9

Preparation examples of the polyamines PA (option 3)

| Bsp. | Ve | R 1a) | g R1a) | R 1b) | g R1b) | R 1c) | g R1c) | LM | g LM | % WS |
|---|---|---|---|---|---|---|---|---|---|---|
| PA24 | a | TETA | 43.8 | BA | 12.8 | HDDA | 45.2 | PM | 101.8 | 50 |
| PA25 | a | TETA | 43.8 | EHA | 18.4 | BDDA | 39.6 | PMA | 101.8 | 50 |
| PA26 | a | DETA | 30.9 | EHA | 18.4 | BDDA | 39.6 | PMA | 88.9 | 50 |
| PA27 | a | TEPA | 56.7 | EHA | 18.4 | BDDA | 45.2 | PMA | 180.5 | 40 |
| PA28 | a | TETA | 43.8 | EHA | 18.4 | HDDA | 45.2 | | | 100 |
| PA29 | a | TETA | 43.8 | EHA | 36.8 | TMPTA | 29.6 | PMA | 257.1 | 30 |
| PA30 | a | TETA | 30.2 | EHA | 15.3 | NPGA | 54.4 | | | 100 |
| PA31 | b | TETA | 43.8 | PGE | 15.0 | HDG | 46.0 | PM | 104.8 | 50 |
| PA32 | b | TETA | 43.8 | EPN | 45.6 | TMPG | 30.2 | PM | 279.1 | 30 |
| PA33 | b | TETA | 43.8 | CGE | 16.4 | HDG | 46.0 | PM | 70.8 | 60 |
| PA34 | b | TETA | 73.0 | CGE | 16.4 | HDG | 92.0 | PM | 181.4 | 50 |
| PA35 | b | TETA | 43.8 | EHA | 18.4 | HDG | 46.0 | PM | 108.2 | 50 |
| PA36 | b | Xy | 136 | EHG | 55 | NPDG | 77 | PM | 327 | 40 |
| PA37 | b | BHMT | 220 | BA | 30 | TMPG | 150 | PM | 650 | 35 |

Bsp. = Example, Ve = method; WS = active substance; PM = methoxy-propanol; PMA = methoxypropyl acetate; TETA = triethylenetetramine; TEPA = tetraethylenepentamine; DETA = diethylenetriamine; BA = butyl acrylate; Xy = 1,4-xylylenediamine; BHMT = bis(hexamethylene)triamine; NPGA - neopentyl glycol propyleneoxy diacrylate; HDDA = 1,6-hexanediol diacrylate; TMPG = trimethylolpropane triglycidyl ether; EHA = 2-ethylhexyl acrylate; NPDG = neopentyl glycol diglycidyl ether; TMPTA = trimethylolpropane triacrylate; EPN = epoxypropyl neodecanoate; PGE = phenyl glycidyl ether; CGE = cresyl glycidyl ether; HDG = 1,6-hexane diglycidyl ether; EHG = 2-ethylhexyl glycidyl ether; BDDA = 1,4-butanediol diacrylate.

Reaction of the Polyamines PA with Uretdione-Containing Components S of the General Formula (III)

Preparation Example PAS45

A reaction vessel equipped with reflux condenser and stirrer is charged with 150 g of uretdione-containing precursor 113, and this initial charge is heated to 90° C. As soon as this temperature is reached, 84.3 g of polyamine PA28 are added. The reaction mixture is then stirred at 100° C. for a further hour.

Preparation Example PAS46

A reaction vessel equipped with reflux condenser and stirrer is charged with 100 g of uretdione-containing precursor 113, and this initial charge is heated to 90° C. As soon as this temperature is reached, 92.7 g of polyamine PA33 are added. The reaction mixture is then stirred at 100° C. for a further hour.

Comparative Example CMP3*

A reaction vessel equipped with reflux condenser and stirrer is charged with 150 g of uretdione-containing precursor 113, and this initial charge is heated to 90° C. As soon as this temperature is reached, 84.3 g of PEI 1200 are added. The reaction mixture is then stirred at 100° C. for a further hour.

*not inventive

Reaction of the Polyamines PA with Monocarboxyl-Functional Polyesters of the General Formula (V)

Preparation Example PAS47

In a reaction vessel equipped with reflux condenser and stirrer, a mixture of 100 g of lauric acid-initiated ε-caprolactone polyester with an acid number of 28 mg KOH/g is heated with 32 g of polyamine PA28 to 120° C. and the mixture is stirred at this temperature for three hours. The resulting product is solid and waxlike at RT.

Reaction of the Polyamines PA with Phosphoric Esters of the General Formula (VI)

Preparation Example PAS48

In a reaction vessel equipped with reflux condenser and stirrer, a mixture of 92.5 g of polyester 3 is heated with 7.5 g of polyphosphoric acid to 90° C. and the mixture is stirred at this temperature for three hours. Addition of 28 g of polyamine PA30 is followed by stirring at 100° C. for a further hour. The resulting product is solid and waxlike at RT.

Preparation Example PAS49

In a reaction vessel equipped with reflux condenser and stirrer, a mixture of 90 g of polyester 4 is heated with 10 g of polyphosphoric acid to 90° C. and the mixture is stirred at this temperature for three hours. Addition of 45 g of polyamine PA25 is followed by stirring at 100° C. for a further hour.

Performance Testing

Use of the polymers of the invention as wetting agents and dispersants for producing pigment concentrates and use thereof in paint systems Starting Materials Uralac SN-804 S2-65 ND polyester resin, manufacturer DSM resins
Cymel 303 melamine-formaldehyde resin, manufacturer Cytec Industries
Dynapol Catalyst 1203 "blocked" sulfonic acid catalyst, manufacturer Evonik
Ti-Pure R960 titanium dioxide pigment, manufacturer Du Pont
Aerosil R972 hydrophobic fumed silica, manufacturer Degussa
Spezial Schwarz 4 carbon black pigment, manufacturer Evonik
Heliogen Blau L 7101 F blue pigment, manufacturer BASF
Solvesso 150 ND aromatic solvent, manufacturer Exxon-Mobil
Dowanol PMA 1-methox-2-propyl acetate, manufacturer Dow Chemical
Dowanol DPM dipropylene glycol monomethyl ether, manufacturer Dow Chemical
DBE "dibasic ester", manufacturer DuPont
Disperbyk 170 wetting and dispersing additive, manufacturer BYK-Chemie Operating Methods:
Production of the Paints:
Ti-Pure R960:
Milling Conditions:
Dispermat CV, Teflon disk, Ø 4 cm, 20 min, 40° C., 8000 rpm (18.8 m/s)
Ratio of millbase to glass beads (1 mm diameter): 1:1 (parts by weight)
Spezial Schwarz 4:
Milling Conditions:
Dispermat CV, Teflon disk, Ø 4 cm, 60 min, 40° C., 10 000 rpm
Ratio of millbase to glass beads (1 mm diameter): 1:1 (parts by weight)
Helioqen Blau L 7101 F:
Milling Conditions:
Dispermat CV, Teflon disk, Ø 4 cm, 40 min, 40° C., 10 000 rpm
Ratio of millbase to glass beads (1 mm diameter): 1:1 (parts by weight)

Composition of the Paints:

|  | Ti-Pure R960 % | Spezial Schwarz 4 % | Heliogen Blue L7101 F % |
|---|---|---|---|
| Millbase |  |  |  |
| Uralac SN-804 S2-65 ND | 25 | 36.9 | 30.8 |
| Disperbyk 170 | 1.5 | — | — |
| Wetting & dispersing additive 30% in PMA | — | 12 | 10.7 |
| Dowanol PMA | — | 5 | 5 |
| Solvent blend* | — | 15 | 20 |
| Solvesso 150 ND | 3 | — | — |
| Aerosil R972 | 0.3 | — | — |
| Ti-Pure R960 | 30 | — | — |
| Spezial Schwarz 4 | — | 12 | — |
| Heliogen Blau L 7101 F | — | — | 16 |
| Letdown |  |  |  |
| Uralac SN-804 S2-65 ND | 24 | 10 | 10 |
| Solvent blend* | — | 9.1 | 7.5 |
| Cymel 303 | 8 | — | — |
| Dynapol Catalyst 1203 | 4 | — | — |
| Dowanol DPM | 2.2 | — | — |
| Solvesso 150 ND | 2 | — | — |
|  | 100 | 100 | 100 |

*Solvent blend: DBE/Solvesso 150 ND = 1:1

Production of the Test Formulations:
Composition of the Test Formulations:

|  | White:black 99:1 | White:blue 99:1 |
|---|---|---|
| Ti-Pure R960 | 97.5 | 98.1 |
| Special Schwarz 4 | 2.5 |  |
| Heliogen Blue L 7101 F |  | 1.9 |
|  | 100.0 | 100.0 |
| Blending | 10 min shaker |  |

The viscosity of the test formulations was adjusted, after their production, using Solvesso 150 ND to 90-120 sec (DIN 4 flow cup, 23° C.).

A portion of the test formulation was scored at 50° C. for 1 week.

Application of the Test Formulation:
Following overnight storage, the test formulations were applied to substrates under the following conditions.
Substrates: Alcan aluminum sheets, precoated with an approximately 5 μm PU primer coat
Doctor blade application: 80 μm (wet)
Oven temperature: 320° C.
Baking time: 30 s Max. metal temperature: 235° C.

Dry film thickness: 18-20 μm

The flooding, floating, and flocculation properties were evaluated as follows:

The respective test formulation was divided into 2 portions.

The first portion of the respective test formulation was stirred using a toothed disk at 6000 revolutions per minute for one minute and then immediately applied to the right-hand half of the substrate surface. At the same time, the second portion of the respective test formulation was applied, without prior stirring, to the left-hand half of the substrate surface.

Rub-Out Test:

Immediately after application, the freshly applied paint films on both halves of the substrate surface were subject to a rub-out test.

For this purpose, a number of areas of the fresh paint coats, after application, were subjected to mechanical rubbing, and then the shade change brought about by the rubbing (rub-out effect) was measured relative to the paint not subjected to rubbing. Causes of the rub-out effect include, for example, flocculation and/or floating of pigments. If there are pigment flocs, they are disrupted by the shearing action during rubbing, and the original target shade is produced. The rub-out effect can be minimized by means of suitable dispersants, and is therefore a measure of the effectiveness of a dispersant.

Colorimetric Measurements:

Instrument: color guide, BYK-Gardner

Illuminant: standard light D65 (daylight)

Measuring field: 10°

Measuring geometry: d/8° spin (diffuse illumination, observation angle 8°)

number of measurements: n=3

The results of the colorimetry are reproduced in the table below.

The ΔE value found for a formulation reports the color difference between the rubbed and unrubbed areas of the coating (rub-out effect).

ΔE1=ΔE not stirred

ΔE2=ΔE stirred

ΔE3=ΔE not stirred/stirred

| | ΔE1 | ΔE2 | ΔE3 | Gloss 60° (not stirred) | Gloss 60° (stirred) | Viscosity of the blue pigment concentrate |
|---|---|---|---|---|---|---|
| After dispersion | | | | | | |
| CMP2* | 0.46 | 0.93 | 1.05 | 84.1 | 83.3 | thixotropic |
| PAS23 | 0.14 | 0.38 | 0.39 | 84.7 | 83.6 | thixotropic |
| PAS24 | 0.28 | 0.20 | 1.02 | 84.5 | 83.6 | thixotropic |
| CMP1* | 0.22 | 0.68 | 0.90 | 83.4 | 81.7 | thixotropic |
| PAS4 | 0.22 | 0.42 | 0.83 | 87.1 | 86.3 | thixotropic |
| After 1 week's storage at 50° C. | | | | | | |
| CMP2* | 0.86 | 2.16 | 0.45 | 86.4 | 85.4 | |
| PAS23 | 0.52 | 1.45 | 0.29 | 86.9 | 86.4 | |
| PAS24 | 0.77 | 1.99 | 0.35 | 86.9 | 86.7 | |
| CMP1* | 1.32 | 2.48 | 0.52 | 83.4 | 82.6 | |
| PAS4 | 1.10 | 2.23 | 0.41 | 88.2 | 86.9 | |

The asterisk "*" denotes a noninventive, comparative example

| | ΔE1 | ΔE2 | ΔE3 | Gloss 60° (not stirred) | Gloss 60° (stirred) | Viscosity of the black pigment concentrate |
|---|---|---|---|---|---|---|
| After dispersion | | | | | | |
| CMP2* | 0.26 | 0.28 | 0.50 | 83.9 | 82.3 | thin |
| PAS23 | 0.15 | 0.14 | 0.25 | 84.5 | 83.1 | thin |
| PAS24 | 0.23 | 0.13 | 0.40 | 84.8 | 83.5 | thin |
| CMP1* | 0.46 | 0.41 | 0.65 | 84.2 | 83.5 | thin |
| PAS4 | 0.13 | 0.34 | 0.44 | 85.2 | 84.8 | thin |
| After 1 week's storage at 50° C. | | | | | | |
| CMP2* | 0.26 | 0.68 | 0.37 | 80.9 | 80.6 | |
| PAS23 | 0.26 | 0.48 | 0.25 | 85.9 | 85.4 | |
| PAS24 | 0.25 | 0.56 | 0.32 | 85.4 | 85.6 | |
| CMP1* | 0.71 | 1.16 | 0.74 | 85.7 | 85.6 | |
| PAS4 | 0.62 | 0.94 | 0.09 | 87.0 | 87.3 | |

The asterisk "*" denotes a noninventive, comparative example

For comparison with one another are PAS23 and PAS24 with the noninventive comparative example CMP2*. PAS4, in contrast, is for comparison with the noninventive comparative example CMP1*. This subdivision is made on the basis of the structural similarity of PAS23 and PAS24 with CMP2*, and also the structural similarity of PAS4 with CMP1*.

Starting Materials:

Uralac SN-804 S2-65 ND polyester resin, manufacturer DSM Resins

Cymel 303 melamine-formaldehyde resin, manufacturer Cytec Industries

Cycat 600 "blocked" acid catalyst, manufacturer Cytec Industries

Ti-Pure R960 titanium dioxide pigment, manufacturer Du Pont

Aerosil R972 hydrophobic fumed silica, manufacturer Degussa

Solvesso 150 ND aromatic solvent, manufacturer ExxonMobil

Dowanol PMA 1-methoxy-2-propyl acetate, manufacturer Dow Chemical

Dowanol DPM dipropylene glycol monomethyl ether, manufacturer Dow Chemical

Disperbyk 170 wetting and dispersing additive, manufacturer BYK-Chemie

Operating Methods:

Production of the Paints:

Ti-Pure R960:

Milling Conditions:

Dispermat CV, Teflon disk, Ø 4 cm, 20 min, 40° C., 8000 rpm (18.8 m/s)

Ratio of millbase to glass beads (1 mm diameter): 1:1 (parts by weight)

Composition of the Paints:

| Polyester/melamine topcoat based on Uralac SN 804 |  |
|---|---|
|  | g |
| Millbase | |
| Uralac SN-804 S2-65 ND | 25 |
| Disperbyk 170 | 1.5 |
| Solvesso 150 ND | 3 |
| Aerosil R972 | 0.3 |
| Ti-Pure R960 | 30 |

-continued

Polyester/melamine topcoat based on Uralac SN 804

|  | g |
| --- | --- |
| Letdown | |
| Uralac SN-804 S2-65 ND | 24 |
| Cymel 303 | 8 |
| Cycat 600* | 0.1 |
| Dowanol DPM | 2.2 |
| Solvesso 150 ND | 2 |

*The formulation was produced without the catalyst. After verification of the chemical stability, 0.1 g of Cycat 600 was added subsequently.

Metering and Incorporation of the Additives:

The additives were added following the addition of the catalyst. First of all, 0.45 g of the additive was stirred in using a spatula and was then incorporated using a Dispermat CV, toothed disk, Ø 4 cm, 3 min, 40° C., 1865 rpm (3 m/s).

Application of the Test Formulation:

The viscosity of the test formulations was adjusted, after their production, using Solvesso 150 ND to 90-120 sec (DIN 4 flow cup, 23° C.).

Following overnight storage, the test formulations were applied to substrates under the following conditions.

Substrates: Alcan aluminum sheets, precoated with an approximately 5 μm PU primer coat
Doctor blade application: 80 μm (wet)
Oven temperature: 320° C.
Max. metal temperature: 232° C.
Baking time: 45 s
Dry film thickness: 20 μm
After baking, the sheets were cooled in water.
To investigate the Clemen hardness the test formulations were applied to tinplate sheets:
Substrates: Krüppel tinplate sheet E1
Doctor blade application: 80 μm (wet)
Oven temperature: 273° C.
Max. metal temperature: 232° C.
Baking time: 30 s
Dry film thickness: 20 μm
After baking, the sheets were cooled in water.
Colorimetric Measurements:
Instrument: Color-Guide, BYK-Gardner
Illuminant: standard light D65 (daylight)
Measuring field: 10°
Measuring geometry: d/8° spin (diffuse illumination, observation angle 8°)
Number of measurements: n=3
Testing of the Crosslinking of the Paints:

For the testing of the crosslinking of the paints, a hammer (1 kg) was immersed in methyl ethyl ketone. Directly after its immersion, the hammer was rubbed back and forth over the surface until the surface was destroyed. The result is represented in double rubs. The numerical values reported indicate the number of double rubs performed until the surface was destroyed.

Gloss Measurement:
Instrument: Micro-TRI-Gloss, BYK Gardner
Angle: 60°
Number of measurements: n=3
Determination of the Clemen Hardness:

The purpose of this test is to evaluate the scratch resistance of the paint surface. This is done using an adjustable weight from 0-20 newtons and a metal pin bearing a hemispherical ball of 1 mm in diameter, producing an incision of 30 mm. The degree of the depth of penetration or destruction of the paint surface is then ascertained.

Instrument: Clemen apparatus, type: Multitester 74
Test tip: rounded tip
Results: the results are reported in newtons (N)
Clemen hardness: The values reported represent the weight for which the surface is not destroyed The results of the paint properties investigated are reproduced in the table below.

| N + D Medium | L a b (unstirred) | YE (313-98) | WE Index (Berger) | Gloss 60° | MEK Double rubs | Clemen (N) |
| --- | --- | --- | --- | --- | --- | --- |
| CMP 1* | 92.73 −1.44 2.61 | 4.10 | 72.21 | 54 | 38 | 2 |
| CMP2* | 93.44 −1.42 2.17 | 3.02 | 75.38 | 62 | 68 | 3 |
| PAS23 | 93.24 −1.54 1.98 | 2.65 | 76.74 | 66 | 100 | 3 |
| PAS24 | 93.63 −1.52 2.12 | 2.58 | 77.02 | 67 | 100 | 3 |

The asterisk "*" denotes a noninventive, comparative example

As the table reveals, the paint with the inventive examples exhibits lower yellowing and a greater whiteness.

In the MEK test with the examples of the invention, a greater number of double rubs were required in order to destroy the surface. This suggests better crosslinking of the paint film in comparison to the noninventive examples. In acid-catalyzed baking systems, therefore, the inventive examples show a clear advantage over the polyethylenimine-based additives.

For further assessment of the inventive compounds, moreover, pigment concentrates were produced on the basis of the grinding resin Laropal A81 (aldehyde resin, BASF). The figures in the formulas below are in grams.

To produce the pigment pastes, the raw materials indicated in the tables below are weighed out in succession into a 500 ml Dispermat pot, admixed with the same quantity of 2 mm glass beads, and then dispersed using a 40 mm Teflon disk at 40° C. The dispersing time for Kronos 2360 titanium dioxide is 30 minutes at 8000 rpm, for Bayferrox 130M iron oxide 40 minutes at 8000 rpm, for Heliogen Blue L7101F 40 minutes at 10000 rpm, and for Spezial Schwarz 4 carbon black 60 Minutes at 10000 rpm.

The dispersed pastes are sieved through a paper sieve (mesh size 80 μm) and dispensed into glass bottles.

Paste Formulas:
Starting Materials:
Laropal A 81 aldehyde resin, manufacturer BASF
Dowanol PMA 1-methoxy-2-propyl acetate, manufacturer Dow Chemical
BYK-Synergist 2100 pigment synergist, manufacturer BYK-Chemie
Aerosil R 972 hydrophobic fumed silica, manufacturer Evonik
Bayferrox 130 M red pigment, manufacturer Bayer
Heliogen Blau L 7101 F blue pigment, manufacturer BASF
Spezial Schwarz 4 carbon black pigment, manufacturer Evonik
Kronos 2360 titanium dioxide pigment, manufacturer Kronos (Quantity Figures in Weight Fractions)

Laropal A 81 pastes

|  | 130 M | L 7101 F | SS 4 |
|---|---|---|---|
| Laropal A-81 (60% in PMA) | 25 | 33.8 | 37.5 |
| Dowanol PMA | 8.6 | 41.0 | 34.5 |
| Dispersant as per preparation example (in 100% form) | 6.0 | 6.3 | 8.0 |
| BYK-Synergist 2100 | — | 0.9 | — |
| Aerosil R 972 | 0.4 | — | — |
| Bayferrox 130 M | 60 | — | — |
| Heliogen Blau L 7101 F | — | 18 | — |
| Spezial Schwarz 4 | — | — | 20 |

White paste

|  | A 81 |
|---|---|
| Laropal A-81 (60% in PMA) | 20 |
| Dowanol PMA | 13.3 |
| Dispersant as per preparation example (in 100% form) | 1.3 |
| BYK-Synergist 2100 | — |
| Aerosil R 972 | 0.4 |
| Kronos 2360 | 65 |

White blends (A 81 pastes)

|  | Setalux 1765 | | | Paraloid B66 | | | Macrynal SM 510 | | |
|---|---|---|---|---|---|---|---|---|---|
| Clear varnish | 14.5 | 18.5 | 19.1 | 19.0 | 18.5 | 19.1 | 12.7 | 12.5 | 12.5 |
| Curing agent | — | — | — | — | — | — | 6.3 | 6.1 | 6.6 |
| Diluent | 4.5 | 4.5 | 4.5 | — | — | — | — | — | — |
| Xylene | — | — | — | 3.0 | 3.0 | 3.0 | — | — | — |
| White paste | 9.9 | 9.9 | 9.9 | 9.9 | 9.9 | 9.9 | 9.9 | 9.9 | 9.9 |
| 130M paste | 1.1 | — | — | 1.1 | — | — | 1.1 | — | — |
| L7101F paste | — | 1.6 | — | — | 1.6 | — | — | 1.6 | — |
| SS4 paste | — | — | 1.0 | 0.5 | — | 1.0 | — | — | 1.0 |
| Blending | 10 min shaker | | | | | | | | |

In order to assess the flocculation stability, rub-out tests were performed. For this purpose, the paint is poured onto a PE film which is at an inclination of approximately 80°, and the painted film is left to evaporate until shortly before initial drying, at which point approximately ⅓ of the painted area is rubbed out with the finger to a state of color constancy. After the film has cured, the difference in shade of both the rubbed-out area and of the unrubbed area is determined, as the ΔE value. The smaller the ΔE value, the better the stabilizing of the pigments with respect to flocculation and separation phenomena.

Clear Varnishes:
Starting Materials:
Setalux 1756 W-65: acrylate resin, 65% strength in solvent naphtha; manufacturer Nuplex
Setamine US 138 BB-70 melamine resin 70% strength in n-butanol, manufacturer Nuplex
Shellsol A aromatic solvent, manufacturer Shell
BYK-310 flow control additive, manufacturer BYK-Chemie
Paraloid B-66 thermoplastic acrylate resin, manufacturer Dow Chemicals
DIDP diisodecyl phthalate
BYK-3550 flow control additive, manufacturer BYK-Chemie
Macrynal SM 510 acrylate resin 60% strength in butyl acetate; manufacturer Cytec
Dowanol PMA 1-methoxy-2-propyl acetate, manufacturer Dow Chemicals
Solvent Naphtha aromatic solvent, manufacturer DHC Solvent Chemie
BYK-066N defoamer, manufacturer BYK-Chemie
BYK-306 flow control additive, manufacturer BYK-Chemie
Desmodur N 75 alphatic polyisocyanate (HDI biuret), 75% strength in 1-methoxy-2-propyl acetate; manufacturer Bayer Acrylate/melamine
Setalux 1756/Setamine US 138 BB-70

| Setalux 1756 VV-65 | 60.0 |
|---|---|
| Setamine US 138 BB-70 | 24.0 |
| Shellsol A (diluent) | 8.0 |
| Xylene (diluent) | 7.8 |
| BYK-310 | 0.2 |
| 15 min evaporation, baking: 25 min 140° C. (284° F.) | |

TPA
Paraloid B-66

| Paraloid B-66 (50% in xylene) | 70.0 |
|---|---|
| DIDP | 2.0 |
| Xylene | 27.9 |
| BYK-3550 | 0.1 |

2 K PU/acrylate
Macrynal SM 510/Desmodur N 75

| Clear varnish | | Curing agent solution | |
|---|---|---|---|
| Macrynal SM 510 (60% strength in butyl acetate) | 75.0 | Desmodur N 75 | 50.0 |
| Dowanol PMA | 5.0 | Butyl acetate | 17.4 |
| Solvent naphtha | 5.0 | Shellsol A | 17.6 |
| Xylene | 6.6 | Dowanol PMA | 5.0 |
| Butyl acetate | 8.0 | Xylene | 10.0 |
| BYK-066N | 0.3 | | |
| BYK-306 | 0.1 | | |
| Clear varnish:curing agent solution 2:1 | | | |

Results of the Rub-Out Tests:

| Pigment paste | Example | Acrylate/melamine (Setalux 1756) ΔE value | TPA (Paraloid B66) ΔE value | 2 K PU/acrylate (Macrynal SM 510) ΔE value |
|---|---|---|---|---|
| Bayferrox Red 130 M/ Laropal A 81 | PAS3 | 0.4 | 0.7 | 0.7 |
| | PAS4 | 0.6 | 0.3 | 0.5 |
| | PAS6 | 0.5 | 2.3 | 0.7 |
| | PAS7 | 0.7 | 1.9 | 0.6 |
| | CMP1* | 2.3 | 4.1 | 1.3 |
| Heliogen Blue L7101F/ Laropal A 81 | PAS3 | 1.9 | 1.9 | 0.9 |
| | PAS4 | 1.3 | 1.5 | 0.8 |
| | PAS6 | 1.9 | 2.3 | 1.3 |
| | PAS7 | 1.8 | 2.2 | 1.1 |
| | CMP1* | 2.0 | 2.4 | 1.6 |
| Spezial Schwarz 4/ | PAS3 | 0.5 | 0.8 | 0.7 |
| | PAS4 | 0.3 | 0.3 | 0.5 |

-continued

| Pigment paste | Example | Acrylate/ melamine (Setalux 1756) ΔE value | TPA (Paraloid B66) ΔE value | 2 K PU/acrylate (Macrynal SM 510) ΔE value |
|---|---|---|---|---|
| Laropal A 81 | PAS6 | 0.4 | 0.2 | 0.8 |
| | PAS7 | 0.4 | 0.9 | 0.9 |
| | CMP1* | 0.5 | 4.7 | 1.5 |

The asterisk "*" denotes a noninventive, comparative example

The white blends produced with the noninventive, comparative example exhibit larger ΔE values in all three systems tested, and therefore show lower stabilization of the pigments towards flocculation and separation phenomena than the inventive examples.

For further assessment of the inventive compounds, polyester-based powder coatings with yellow pigmentation were produced and were applied to aluminum Q-panels using an electrostatic powder gun at 80 kV/2 bar. For curing, the panels were baked at 180° C. circulated-air temperature for 14 minutes. Evaluation took place according to the gloss values at 20°. The higher the value, the better the result. The figures in the formulas below are in grams.

Powder Coating Formula:

| Item | Raw material | |
|---|---|---|
| | Binder/curing agent | |
| 1 | Crylcoat 2617-3 | 82.1 |
| 2 | Primid XL-552 | 4.3 |
| | Total | 86.4 |
| 3 | Additive | 3 |
| 4 | Benzoin | 0.4 |
| 5 | BYK-368 P | 1.2 |
| 6 | Pigment: C.I. Pigment Yellow 139 e.g., Paliotol Gelb L 2140 HD (BASF) | 12 |
| | | 16.6 |
| | 500 g batches on ZSK 18 laboratory extruder (from Coperion) | |
| | Premix without pigments | 5'2000 rpm |
| | Temperatures ° C. | 45/100/100/100/100 |
| | Torque % | 45 ± 5 |
| | Rotary speed rpm | 400 |

Crylcoat 2617-3: = carboxylated polyester resin, Tg: 62° C. (from Allnex)
Primid XL-552: = beta-hydroxylamide crosslinker, OH number: 660, m.p.: 120-124° C. (from EMS-Chemie)
Byk-368 P: = polyacrylate based surface additive (from Byk-Chemie)

Results:

| Example | Product used | Gloss 20° |
|---|---|---|
| 1 | PAS45 | 59 |
| 2 | PAS46 | 57 |
| 3 | PAS 47 | 51 |
| 4* | CMP3* | 45 |

*(not inventive)

The invention claimed is:
1. A method comprising utilizing an amino group-comprising polymer PAS or salt thereof as wetting agent and/or dispersant, the amino group-comprising polymer PAS or salt thereof obtained by reaction with an acid, the polymer being obtained by a multistage synthesis wherein an intermediate PA is prepared by reaction of at least one compound P with at least an amine A, the compound P comprising 2 to 6 groups that are reactive toward hydroxyl groups and/or amino groups, and the amine A comprising
  (i) m=1 to 8 primary and/or secondary amino groups,
  (ii) n=0 to 5 hydroxyl groups and
  (iii) l=0 to 5 tertiary amino groups, where
  (iv) m+n≥2 and
  (v) the compound A besides nitrogen atoms, oxygen atoms, and hydroxyl groups contains only hydrocarbon groups, and
the intermediate PA has structural units of the general formula (I)

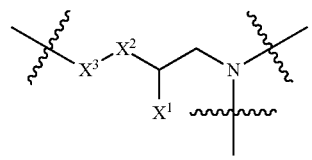

in which
$X^1$=H or OH,
$X^2$=$CH_2$ or C=O, and
$X^3$=O or NH,
and where the intermediate PA
  (a) is reacted with one or more components S that are reactive toward hydroxyl groups and/or amino groups, to give an amino group-comprising polymer, and/or
  (b) is reacted in a ring-opening polymerization with at least one lactone or with a mixture of lactones, to give an amino group-comprising polymer,
  (c) and 0-80% of the primary and secondary amino groups present originally in the intermediate PA are reacted with one or more species of a component U, selected from the group of the hydroxyl-functional acrylates and/or a cyclic compound selected from the group of the oxiranes and oxetanes, the lactones, and cyclic carbonates, the reaction taking place with introduction of hydroxyl groups,
whereby the reactions under (a), (b), and (c) may take place in any desired combination and temporal sequence relative to one another;
wherein said utilizing as a wetting agent and/or dispersant comprises dispersing solid therein; admixing with, applying to, or coating on a solid; introducing in or adding to a dispersion containing solid or a suspension including solid; wherein said solid is a pigment or filler, wherein the amino group-comprising polymer PAS or salt thereof functions as a wetting agent and/or dispersant for the pigment or filler;
or wherein said utilizing as a wetting agent and/or dispersant comprises adding amino group-comprising polymer PAS or salt thereof to a carrier medium and adding solid thereto; wherein said solid is a pigment or filler, and wherein the amino group-comprising polymer PAS or salt thereof functions as a wetting agent and/or dispersant for the pigment or filler.

2. The method as claimed in claim 1, characterized in that the intermediate PA is prepared by reaction of ethylenically unsaturated ester compounds P, in which the C=C double bond and the carbonyl double bond of the ester are conjugated, with diamines or with amines which as well as a primary amino group comprise at least one further group that is reactive toward the ester, or which as well as a secondary amino group comprise at least two further groups that are reactive toward the ester.

3. The method as claimed in claim 2, characterized in that the further groups that are reactive toward the ester are primary or secondary amino groups and/or hydroxyl groups.

4. The method as claimed in claim 1, characterized in that the intermediate PA is a dendritic polyamine which is prepared in a multistage reaction wherein in the first stage an amine A or $NH_3$ and an alkyl acrylate as component P are reacted with one another and in at least one further stage the reaction product is reacted with a stoichiometric excess of diamine.

5. The method as claimed in claim 1, characterized in that the intermediate PA is prepared by reaction of an amine A with compounds P which comprise two to six epoxide groups and/or acrylic groups.

6. The method as claimed in claim 1, characterized in that component S comprises an isocyanate adduct of the general formula (II)

 (II)

Y—O—CO—NH—R$^1$NCO in which $R^1$ is alike or different and is represented by a saturated or unsaturated, branched or unbranched organic radical comprising 6 to 20 carbon atoms, and Y is a monomeric or polymeric group which is not reactive toward isocyanates and which comprises one or more aliphatic, cycloaliphatic, araliphatic and/or aromatic groups, with Y possessing a number-average molar mass of less than 20,000 g/mol.

7. The method as claimed in claim 1, characterized in that component S comprises a uretdione compound of the general formula (III)

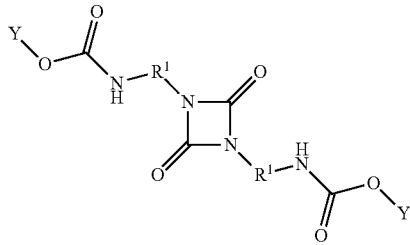 (III)

in which $R^1$ is alike or different and is represented by a saturated or unsaturated, branched or unbranched organic radical comprising 6 to 20 carbon atoms, and Y is a monomeric or polymeric group which is not reactive toward isocyanates and which comprises one or more aliphatic, cycloaliphatic, araliphatic and/or aromatic groups, with Y possessing a number-average molar mass of less than 20,000 g/mol.

8. The method as claimed in claim 1, characterized in that component S comprises an acrylate of the general formula (IV)

 (IV)

$H_2C=CH—COO—Y$ in which Y is a monomeric or polymeric group which is not reactive toward isocyanates and which comprises one or more aliphatic, cycloaliphatic, araliphatic and/or aromatic groups, with Y possessing a number-average molar mass of less than 20,000 g/mol.

9. The method as claimed in claim 1, characterized in that component S comprises an acid selected from the group of the carboxylic acids, phosphoric esters, and sulfonic acids, and the polymer PAS is obtained by reaction of the intermediate PA, or of a PA modified by reaction of PA by one or more of the reactions (a), (b) and (c), with compounds of the general formulae (V), (VI), or (VII)

$(HOOC)_p—Y(X^1)_r$ (V)

$(OH)_{3-v}PO(O—Y(X^1)_r)_v$ (VI)

$Y—SO_2—OH$ (VII)

in which $X^1$=H or OH, p=1-3, r=1-5, v=1 or 2, and Y is a monomeric or polymeric group which is not reactive toward isocyanates and which comprises one or more aliphatic, cycloaliphatic, araliphatic and/or aromatic groups, with Y possessing a number-average molar mass of less than 20,000 g/mol.

10. The method as claimed in claim 1, characterized in that the polymer PAS or salt thereof is obtained by reaction of the intermediate PA, or of a PA modified by reaction of PA by one or more of the reactions (a), (b), and (c) with at least one lactone or with a mixture of lactones in a ring-opening polymerization.

11. The method as claimed in claim 1, characterized in that said solid is a pigment.

12. The method as claimed in claim 11, wherein said method produces or processes a pigment concentrate containing the pigment solid.

13. The method as claimed in claim 1, wherein said method produces or processes a filler solid.

14. The method as claimed in claim 1, wherein said method produces or processes coating materials containing the pigment solid.

15. The method as claimed in claim 1, wherein said method produces or processes a paint or varnish containing the pigment solid.

16. The method as claimed in claim 1, whereby the pigment or filler solid which has been dispersed in, has been admixed with, has had applied thereto, or has been coated with the amino group-comprising polymer PAS or salt thereof, when used in a coating, paste or concentrate exhibits higher flocculation stability, increased gloss or greater color strength relative to untreated solid thus used.

17. The method as claimed in claim 1, whereby the dispersion, carrier medium or suspension into which the amino group-comprising polymer PAS or salt thereof is introduced or added exhibits lower surface tension or interfacial tension, and increased wetting capacity relative to the dispersion, carrier medium or suspension without the amino group-comprising polymer PAS or salt thereof.

* * * * *